(12) United States Patent
Rosenberg et al.

(10) Patent No.: US 12,079,459 B2
(45) Date of Patent: *Sep. 3, 2024

(54) HYPER-SWARM METHOD AND SYSTEM FOR COLLABORATIVE FORECASTING

(71) Applicant: Unanimous A. I., Inc., Arlington, VA (US)

(72) Inventors: Louis B. Rosenberg, San Luis Obispo, CA (US); Gregg Willcox, Seattle, WA (US)

(73) Assignee: Unanimous A. I., Inc., Arlington, VA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/744,464

(22) Filed: May 13, 2022

(65) Prior Publication Data

US 2022/0276774 A1    Sep. 1, 2022

Related U.S. Application Data

(63) Continuation of application No. 17/024,580, filed on Sep. 17, 2020, now Pat. No. 11,360,656, which is a
(Continued)

(51) Int. Cl.
*G06F 3/04847* (2022.01)
*G06F 3/04842* (2022.01)
(Continued)

(52) U.S. Cl.
CPC ...... *G06F 3/04847* (2013.01); *G06F 3/04842* (2013.01); *G06Q 10/101* (2013.01);
(Continued)

(58) Field of Classification Search
CPC ............ G06F 3/04847; G06F 3/04842; G06Q 10/101; G06Q 50/01; H04L 67/10; H04L 67/12
See application file for complete search history.

(56) References Cited

U.S. PATENT DOCUMENTS 5,236,199 A    8/1993  Thompson, Jr.
5,400,248 A    3/1995  Chisholm
(Continued)

FOREIGN PATENT DOCUMENTS

CA    2414397    8/2003
EP    3123442    2/2017
(Continued)

OTHER PUBLICATIONS

"Dialogr—A simple tool for collective thinking"; Mar. 25, 2015; http://www.dialogr.com./; 1 page.
(Continued)

*Primary Examiner* — Jeremy L Stanley
(74) *Attorney, Agent, or Firm* — Fitch, Even, Tabin & Flannery LLP

(57) ABSTRACT

Systems and methods for amplifying the intelligence of networked human populations, maximizing the accuracy of collaborative forecasts and group insights. This includes systems and methods for sending and presenting a forecasting query for a future event to a plurality of participants, each using a networked computing device, the forecasting query describing a future event to be collaboratively predicted by the population of human participants. An initial forecast response is collected from each participant and analyzed by a central server. A plurality of unique overlapping subsets of responses are determined by the server. Unique overlapping subsets of unique initial forecast responses are then displayed, at substantially the same time, on each computing device. A second forecast response is collected from each participant and a final forecast is determined.

18 Claims, 15 Drawing Sheets

Related U.S. Application Data continuation of application No. 16/230,759, filed on Dec. 21, 2018, now Pat. No. 10,817,158, which is a continuation-in-part of application No. 16/154,613, filed on Oct. 8, 2018, now Pat. No. 11,269,502, which is a continuation-in-part of application No. 16/059,698, filed on Aug. 9, 2018, now Pat. No. 11,151,460, which is a continuation-in-part of application No. 15/922,453, filed on Mar. 15, 2018, now abandoned, which is a continuation-in-part of application No. 15/904,239, filed on Feb. 23, 2018, now Pat. No. 10,416,666, which is a continuation-in-part of application No. 15/898,468, filed on Feb. 17, 2018, now Pat. No. 10,712,929, said application No. 15/898,468 is a continuation-in-part of application No. 15/815,579, filed on Nov. 16, 2017, now Pat. No. 10,439,836, which is a continuation-in-part of application No. 15/640,145, filed on Jun. 30, 2017, now Pat. No. 10,353,551, which is a continuation-in-part of application No. 15/241,340, filed on Aug. 19, 2016, now Pat. No. 10,222,961, which is a continuation-in-part of application No. 15/086,034, filed on Mar. 30, 2016, now Pat. No. 10,310,802, which is a continuation-in-part of application No. 15/052,876, filed on Feb. 25, 2016, now Pat. No. 10,110,664, which is a continuation-in-part of application No. 15/047,522, filed on Feb. 18, 2016, now Pat. No. 10,133,460, which is a continuation-in-part of application No. 15/017,424, filed on Feb. 5, 2016, now abandoned, which is a continuation-in-part of application No. 14/925,837, filed on Oct. 28, 2015, now Pat. No. 10,551,999, which is a continuation-in-part of application No. 14/920,819, filed on Oct. 22, 2015, now Pat. No. 10,277,645, which is a continuation-in-part of application No. 14/859,035, filed on Sep. 18, 2015, now Pat. No. 10,122,775, said application No. 14/859,035 is a continuation-in-part of application No. 14/738,768, filed on Jun. 12, 2015, now Pat. No. 9,940,006, which is a continuation-in-part of application No. 14/708,038, filed on May 8, 2015, now abandoned, said application No. 14/708,038 is a continuation-in-part of application No. 14/668,970, filed on Mar. 25, 2015, now Pat. No. 9,959,028.

(60) Provisional application No. 62/611,756, filed on Dec. 29, 2017, provisional application No. 62/569,909, filed on Oct. 9, 2017, provisional application No. 62/552,968, filed on Aug. 31, 2017, provisional application No. 62/544,861, filed on Aug. 13, 2017, provisional application No. 62/473,424, filed on Mar. 19, 2017, provisional application No. 62/473,442, filed on Mar. 19, 2017, provisional application No. 62/473,429, filed on Mar. 19, 2017, provisional application No. 62/463,657, filed on Feb. 26, 2017, provisional application No. 62/460,861, filed on Feb. 19, 2017, provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
  *G06Q 10/101* (2023.01)
  *G06Q 50/00* (2012.01)
  *H04L 67/10* (2022.01)
  *H04L 67/12* (2022.01)

(52) U.S. Cl.
  CPC ............ *G06Q 50/01* (2013.01); *H04L 67/10* (2013.01); *H04L 67/12* (2013.01)

(56) References Cited

U.S. PATENT DOCUMENTS

| | | | | |
|---|---|---|---|---|
| 5,808,908 | A | 9/1998 | Ghahramani | |
| 5,867,799 | A | 2/1999 | Lang | |
| 6,064,978 | A | 5/2000 | Gardner | |
| 6,480,210 | B1 | 11/2002 | Martino | |
| 6,792,399 | B1* | 9/2004 | Phillips | G06Q 40/04 705/37 |
| 6,903,723 | B1 | 6/2005 | Forest | |
| 6,944,596 | B1 | 9/2005 | Gray | |
| 7,031,842 | B1 | 4/2006 | Musat | |
| 7,155,510 | B1 | 12/2006 | Kaplan | |
| 7,158,112 | B2 | 1/2007 | Rosenberg | |
| 7,451,213 | B2* | 11/2008 | Kaplan | G06Q 10/04 709/227 |
| 7,489,979 | B2 | 2/2009 | Rosenberg | |
| 7,542,816 | B2 | 6/2009 | Rosenberg | |
| 7,562,117 | B2 | 7/2009 | Rosenberg | |
| 7,603,414 | B2 | 10/2009 | Rosenberg | |
| 7,624,077 | B2 | 11/2009 | Bonabeau | |
| 7,831,928 | B1 | 11/2010 | Rose | |
| 7,856,602 | B2 | 12/2010 | Armstrong | |
| 7,917,148 | B2 | 3/2011 | Rosenberg | |
| 7,937,285 | B2 | 5/2011 | Goldberg | |
| 8,176,101 | B2 | 5/2012 | Rosenberg | |
| 8,209,250 | B2* | 6/2012 | Bradway | G06Q 40/04 705/36 R |
| 8,250,071 | B1 | 8/2012 | Killalea | |
| 8,341,065 | B2 | 12/2012 | Berg | |
| 8,583,470 | B1 | 11/2013 | Fine | |
| 8,589,488 | B2 | 11/2013 | Huston | |
| 8,655,804 | B2 | 2/2014 | Carrabis | |
| 8,660,972 | B1 | 2/2014 | Heidenreich | |
| 8,676,735 | B1 | 3/2014 | Heidenreich | |
| 8,745,104 | B1 | 6/2014 | Rosenberg | |
| 8,762,435 | B1 | 6/2014 | Rosenberg | |
| 9,483,161 | B2 | 11/2016 | Wenger | |
| 9,710,836 | B1 | 7/2017 | O'Malley | |
| 9,940,006 | B2 | 4/2018 | Rosenberg | |
| 9,959,028 | B2 | 5/2018 | Rosenberg | |
| 10,110,664 | B2 | 10/2018 | Rosenberg | |
| 10,122,775 | B2 | 11/2018 | Rosenberg | |
| 10,133,460 | B2 | 11/2018 | Rosenberg | |
| 10,222,961 | B2 | 3/2019 | Rosenberg | |
| 10,277,645 | B2 | 4/2019 | Rosenberg | |
| 10,310,802 | B2* | 6/2019 | Rosenberg | H04L 67/10 |
| 10,332,412 | B2 | 6/2019 | Swank | |
| 10,353,551 | B2 | 7/2019 | Rosenberg | |
| 10,416,666 | B2 | 9/2019 | Rosenberg | |
| 10,439,836 | B2 | 10/2019 | Rosenberg | |
| 10,551,999 | B2 | 2/2020 | Rosenberg | |
| 10,599,315 | B2 | 3/2020 | Rosenberg | |
| 10,606,463 | B2 | 3/2020 | Rosenberg | |
| 10,606,464 | B2 | 3/2020 | Rosenberg | |
| 10,609,124 | B2 | 3/2020 | Rosenberg | |

(56) References Cited

U.S. PATENT DOCUMENTS

| | | |
|---|---|---|
| 10,656,807 B2 | 5/2020 | Rosenberg |
| 10,712,929 B2 | 7/2020 | Rosenberg |
| 10,817,158 B2* | 10/2020 | Rosenberg .......... G06F 3/04842 |
| 10,817,159 B2 | 10/2020 | Willcox |
| 11,151,460 B2 | 10/2021 | Rosenberg |
| 11,269,502 B2 | 3/2022 | Rosenberg |
| 11,360,655 B2 | 6/2022 | Willcox |
| 11,360,656 B2 | 6/2022 | Rosenberg |
| 2001/0042010 A1 | 11/2001 | Hassell |
| 2002/0042920 A1 | 4/2002 | Thomas |
| 2002/0107726 A1 | 8/2002 | Torrance |
| 2002/0129106 A1 | 9/2002 | Gutfreund |
| 2002/0171690 A1 | 11/2002 | Fox |
| 2003/0023685 A1* | 1/2003 | Cousins ............... G09B 7/00 709/205 |
| 2003/0033193 A1 | 2/2003 | Holloway |
| 2003/0065604 A1 | 4/2003 | Gatto |
| 2003/0079218 A1 | 4/2003 | Goldberg |
| 2003/0088458 A1* | 5/2003 | Afeyan ............... G06N 7/01 706/13 |
| 2003/0210227 A1 | 11/2003 | Smith |
| 2003/0227479 A1 | 12/2003 | Mizrahi |
| 2004/0015429 A1 | 1/2004 | Tighe |
| 2004/0210550 A1 | 10/2004 | Williams |
| 2005/0067493 A1* | 3/2005 | Urken ............... G06Q 10/10 235/386 |
| 2005/0075919 A1 | 4/2005 | Kim |
| 2005/0168489 A1 | 8/2005 | Ausbeck |
| 2005/0218601 A1 | 10/2005 | Capellan |
| 2005/0261953 A1 | 11/2005 | Malek |
| 2006/0010057 A1* | 1/2006 | Bradway ............ G06Q 40/00 705/35 |
| 2006/0147890 A1 | 7/2006 | Bradford |
| 2006/0200401 A1 | 9/2006 | Lisani |
| 2006/0204945 A1 | 9/2006 | Masuichi |
| 2006/0218179 A1 | 9/2006 | Gardner |
| 2006/0250357 A1 | 11/2006 | Safai |
| 2007/0011073 A1 | 1/2007 | Gardner |
| 2007/0039031 A1 | 2/2007 | Cansler, Jr. |
| 2007/0055610 A1* | 3/2007 | Palestrant .......... G06Q 30/0601 705/37 |
| 2007/0067211 A1* | 3/2007 | Kaplan ............... G06Q 10/04 705/7.31 |
| 2007/0072156 A1 | 3/2007 | Kaufman |
| 2007/0078977 A1* | 4/2007 | Kaplan ............... G06Q 10/04 709/224 |
| 2007/0097150 A1 | 5/2007 | Ivashin |
| 2007/0099162 A1* | 5/2007 | Sekhar ............... G06Q 10/10 434/323 |
| 2007/0121843 A1 | 5/2007 | Atazky |
| 2007/0124503 A1 | 5/2007 | Ramos |
| 2007/0208727 A1 | 9/2007 | Saklikar |
| 2007/0209069 A1 | 9/2007 | Saklikar |
| 2007/0211050 A1 | 9/2007 | Ohta |
| 2007/0216712 A1 | 9/2007 | Louch |
| 2007/0220100 A1 | 9/2007 | Rosenberg |
| 2007/0226296 A1 | 9/2007 | Lowrance |
| 2007/0294067 A1 | 12/2007 | West |
| 2008/0003559 A1 | 1/2008 | Toyama |
| 2008/0015115 A1 | 1/2008 | Guyot-Sionnest |
| 2008/0016463 A1 | 1/2008 | Marsden |
| 2008/0091777 A1 | 4/2008 | Carlos |
| 2008/0103877 A1* | 5/2008 | Gerken ............... G06Q 30/0203 705/7.32 |
| 2008/0140477 A1* | 6/2008 | Tevanian ............ G06Q 30/0204 705/7.33 |
| 2008/0140688 A1* | 6/2008 | Clayton ............. G06Q 10/0637 |
| 2008/0189634 A1* | 8/2008 | Tevanian ............ G06Q 40/06 715/764 |
| 2008/0195459 A1 | 8/2008 | Stinski |
| 2009/0037355 A1 | 2/2009 | Brave |
| 2009/0063379 A1* | 3/2009 | Kelly ............... G06Q 10/00 706/46 |
| 2009/0063463 A1 | 3/2009 | Turner |
| 2009/0063991 A1* | 3/2009 | Baron ............... H04L 12/1822 715/751 |
| 2009/0063995 A1 | 3/2009 | Baron |
| 2009/0073174 A1* | 3/2009 | Berg ............... G06T 11/203 345/442 |
| 2009/0076939 A1* | 3/2009 | Berg ............... G06Q 40/04 705/37 |
| 2009/0076974 A1* | 3/2009 | Berg ............... G06Q 40/04 705/36 R |
| 2009/0125821 A1 | 5/2009 | Johnson |
| 2009/0239205 A1* | 9/2009 | Morgia ............... G09B 7/00 434/362 |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0100204 A1 | 4/2010 | Ng |
| 2010/0144426 A1 | 6/2010 | Winner |
| 2010/0145715 A1 | 6/2010 | Cohen |
| 2010/0169144 A1 | 7/2010 | Estill |
| 2010/0174579 A1 | 7/2010 | Hughes |
| 2010/0199191 A1 | 8/2010 | Takahashi |
| 2010/0205541 A1 | 8/2010 | Rapaport |
| 2010/0299616 A1 | 11/2010 | Chen |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208328 A1* | 8/2011 | Cairns ............... G06Q 10/04 700/93 |
| 2011/0208684 A1 | 8/2011 | Dube |
| 2011/0208822 A1 | 8/2011 | Rathod |
| 2011/0276396 A1 | 11/2011 | Rathod |
| 2011/0288919 A1 | 11/2011 | Gross |
| 2011/0320536 A1 | 12/2011 | Lobb |
| 2012/0005131 A1 | 1/2012 | Horvitz |
| 2012/0011006 A1* | 1/2012 | Schultz ............... G06Q 10/10 709/203 |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1 | 4/2012 | Considine |
| 2012/0101933 A1* | 4/2012 | Hanson ............... G06F 3/04847 705/37 |
| 2012/0109883 A1 | 5/2012 | Iordanov |
| 2012/0110087 A1* | 5/2012 | Culver ............... G06Q 10/067 709/205 |
| 2012/0179567 A1 | 7/2012 | Soroca |
| 2012/0191774 A1* | 7/2012 | Bhaskaran ............ H04H 60/33 709/203 |
| 2012/0290950 A1 | 11/2012 | Rapaport |
| 2012/0316962 A1 | 12/2012 | Rathod |
| 2013/0013248 A1 | 1/2013 | Brugler |
| 2013/0019205 A1 | 1/2013 | Gil |
| 2013/0035989 A1 | 2/2013 | Brown |
| 2013/0041720 A1 | 2/2013 | Spires |
| 2013/0097245 A1 | 4/2013 | Adarraga |
| 2013/0103692 A1 | 4/2013 | Raza |
| 2013/0132284 A1* | 5/2013 | Convertino .......... G06Q 10/103 705/300 |
| 2013/0160142 A1 | 6/2013 | Lai |
| 2013/0171594 A1 | 7/2013 | Gorman |
| 2013/0184039 A1 | 7/2013 | Steir |
| 2013/0191181 A1 | 7/2013 | Balestrieri |
| 2013/0191390 A1 | 7/2013 | Engel |
| 2013/0203506 A1* | 8/2013 | Brown ............... G06Q 30/0203 463/42 |
| 2013/0231595 A1 | 9/2013 | Zoss |
| 2013/0254146 A1 | 9/2013 | Ellis |
| 2013/0298690 A1 | 11/2013 | Bond |
| 2013/0300740 A1 | 11/2013 | Snyder |
| 2013/0311904 A1 | 11/2013 | Tien |
| 2013/0339445 A1 | 12/2013 | Perincherry |
| 2014/0006042 A1 | 1/2014 | Keefe |

(56) References Cited

U.S. PATENT DOCUMENTS

| | | | |
|---|---|---|---|
| 2014/0012780 A1* | 1/2014 | Sanders | G06Q 40/04 705/36 R |
| 2014/0047356 A1 | 2/2014 | Ameller-Van-Baumberghen et al. | |
| 2014/0057240 A1* | 2/2014 | Colby | H04L 12/1822 434/350 |
| 2014/0074751 A1* | 3/2014 | Rocklitz | G06Q 40/06 705/36 R |
| 2014/0075004 A1* | 3/2014 | Van Dusen | G06F 16/90335 709/223 |
| 2014/0089233 A1 | 3/2014 | Ellis | |
| 2014/0089521 A1 | 3/2014 | Horowitz | |
| 2014/0100924 A1* | 4/2014 | Ingenito | G06Q 10/10 705/12 |
| 2014/0108915 A1 | 4/2014 | Lu | |
| 2014/0128162 A1* | 5/2014 | Arafat | A63F 13/795 463/42 |
| 2014/0129946 A1 | 5/2014 | Harris | |
| 2014/0162241 A1* | 6/2014 | Morgia | G06Q 50/10 434/362 |
| 2014/0171039 A1 | 6/2014 | Bjontegard | |
| 2014/0214831 A1 | 7/2014 | Chi | |
| 2014/0249689 A1 | 9/2014 | Bienkowski | |
| 2014/0249889 A1 | 9/2014 | Park | |
| 2014/0258970 A1 | 9/2014 | Brown | |
| 2014/0278835 A1 | 9/2014 | Moseson | |
| 2014/0279625 A1 | 9/2014 | Carter | |
| 2014/0282586 A1 | 9/2014 | Shear | |
| 2014/0310607 A1 | 10/2014 | Abraham | |
| 2014/0316616 A1 | 10/2014 | Kugelmass | |
| 2014/0337097 A1* | 11/2014 | Farlie | G06Q 30/0203 705/7.32 |
| 2014/0351719 A1 | 11/2014 | Cattermole | |
| 2014/0358825 A1 | 12/2014 | Phillipps | |
| 2014/0379439 A1 | 12/2014 | Sekhar | |
| 2015/0006492 A1 | 1/2015 | Wexler | |
| 2015/0065214 A1* | 3/2015 | Olson | G07F 17/3276 463/9 |
| 2015/0089399 A1* | 3/2015 | Megill | H04L 12/1813 715/753 |
| 2015/0120619 A1* | 4/2015 | Baughman | G06N 7/01 706/12 |
| 2015/0149932 A1 | 5/2015 | Yamada | |
| 2015/0154557 A1 | 6/2015 | Skaaksrud | |
| 2015/0156233 A1* | 6/2015 | Bergo | H04M 3/567 715/753 |
| 2015/0170050 A1 | 6/2015 | Price | |
| 2015/0192437 A1 | 7/2015 | Bouzas | |
| 2015/0236866 A1 | 8/2015 | Colby | |
| 2015/0242755 A1* | 8/2015 | Gross | G06Q 30/0241 706/46 |
| 2015/0242972 A1 | 8/2015 | Lemmey | |
| 2015/0248817 A1 | 9/2015 | Steir | |
| 2015/0262208 A1 | 9/2015 | Bjontegard | |
| 2015/0302308 A1* | 10/2015 | Bartek | G06N 5/045 706/46 |
| 2015/0310687 A1* | 10/2015 | Morgia | G07C 13/00 705/12 |
| 2015/0326625 A1 | 11/2015 | Rosenberg | |
| 2015/0331601 A1* | 11/2015 | Rosenberg | G06F 3/04842 715/753 |
| 2015/0339020 A1* | 11/2015 | D'Amore | G06Q 10/06 715/753 |
| 2015/0347903 A1 | 12/2015 | Saxena | |
| 2016/0034305 A1 | 2/2016 | Shear | |
| 2016/0044073 A1* | 2/2016 | Rosenberg | H04L 67/535 715/753 |
| 2016/0048274 A1 | 2/2016 | Rosenberg | |
| 2016/0055236 A1* | 2/2016 | Frank | G06F 40/35 707/748 |
| 2016/0057182 A1* | 2/2016 | Rosenberg | G06F 3/0482 715/753 |
| 2016/0062735 A1 | 3/2016 | Wilber | |
| 2016/0078458 A1* | 3/2016 | Gold | G06Q 30/0203 705/7.32 |
| 2016/0082348 A1* | 3/2016 | Kehoe | G06Q 10/101 463/31 |
| 2016/0092989 A1* | 3/2016 | Marsh | G06Q 40/00 705/37 |
| 2016/0098778 A1 | 4/2016 | Blumenthal | |
| 2016/0154570 A1 | 6/2016 | Rosenberg | |
| 2016/0170594 A1* | 6/2016 | Rosenberg | H04L 69/24 715/753 |
| 2016/0170616 A1* | 6/2016 | Rosenberg | G06F 3/0485 715/753 |
| 2016/0189025 A1* | 6/2016 | Hayes | G06Q 10/101 706/29 |
| 2016/0209992 A1 | 7/2016 | Rosenberg | |
| 2016/0210602 A1 | 7/2016 | Siddique | |
| 2016/0274779 A9* | 9/2016 | Rosenberg | G06F 3/04847 |
| 2016/0277457 A9 | 9/2016 | Rosenberg | |
| 2016/0284172 A1 | 9/2016 | Weast | |
| 2016/0314527 A1 | 10/2016 | Rosenberg | |
| 2016/0320956 A9 | 11/2016 | Rosenberg | |
| 2016/0335647 A1* | 11/2016 | Rebrovick | G06Q 30/0203 |
| 2016/0349976 A1 | 12/2016 | Lauer | |
| 2016/0357418 A1* | 12/2016 | Rosenberg | H04L 67/14 |
| 2016/0366200 A1 | 12/2016 | Healy | |
| 2017/0083974 A1 | 3/2017 | Guillen | |
| 2017/0091633 A1 | 3/2017 | Vemula | |
| 2017/0223411 A1 | 8/2017 | De Juan | |
| 2017/0300198 A1* | 10/2017 | Rosenberg | G06F 3/04842 |
| 2018/0076968 A1 | 3/2018 | Rosenberg | |
| 2018/0181117 A1 | 6/2018 | Rosenberg | |
| 2018/0196593 A1 | 7/2018 | Rosenberg | |
| 2018/0203580 A1 | 7/2018 | Rosenberg | |
| 2018/0204184 A1 | 7/2018 | Rosenberg | |
| 2018/0217745 A1 | 8/2018 | Rosenberg | |
| 2018/0239523 A1 | 8/2018 | Rosenberg | |
| 2018/0373991 A1 | 12/2018 | Rosenberg | |
| 2018/0375676 A1* | 12/2018 | Bader-Natal | G06F 3/0481 |
| 2019/0014170 A1 | 1/2019 | Rosenberg | |
| 2019/0034063 A1 | 1/2019 | Rosenberg | |
| 2019/0042081 A1 | 2/2019 | Rosenberg | |
| 2019/0066133 A1* | 2/2019 | Cotton | G06Q 30/0202 |
| 2019/0121529 A1* | 4/2019 | Rosenberg | G06F 3/04842 |
| 2019/0212908 A1 | 7/2019 | Willcox | |
| 2020/0005341 A1* | 1/2020 | Marsh | G06Q 40/04 |
| 2021/0004149 A1 | 1/2021 | Willcox | |
| 2021/0004150 A1 | 1/2021 | Rosenberg | |
| 2021/0209554 A1* | 7/2021 | Hill | G06Q 10/101 |
| 2021/0241127 A1 | 8/2021 | Rosenberg | |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Atanasov et al; "Distilling the Wisdom of Crowds: Prediction Markets vs. Prediction Polls"; Management Science, Articles in Advance; pp. 1-16; http://dx.doi.org/10.1287/mnsc.2015.2374; 2016 INFORMS (Year 2016).

Beni; "From Swarm Intelligence to Swarm Robotics"; Swarm Robotics WS 2004, LNCS 3342; pp. 1-9; 2005.

(56) References Cited

OTHER PUBLICATIONS

Combined Search and Examination Report under Sections 17 & 18(3) for GB2202778.3 issued by the GB Intellectual Property Office dated Mar. 10, 2022.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Ding et al; "Time Weight Collaborative Filtering"; CIKM'05, Oct. 31-Nov. 5, 2005; Bremen, Germany; pp. 485-492.
EP; Extended European Search Report for EP Application No. 15767909.3 mailed from the European Patent Office dated Sep. 4, 2017.
EP; Extended European Search Report for EP Application No. 15808982.1 mailed from the European Patent Office dated Nov. 28, 2017.
EP; Extended European Search Report for EP Application No. 15852495.9 mailed from the European Patent Office dated Mar. 21, 2018.
Examination Report for Indian Patent Application No. 201747000968 mailed from the Indian Patent Office dated Nov. 4, 2020.
Examination Report under Section 18(3) for GB1805236.5 mailed from the Intellectual Property Office dated Jul. 30, 2021.
Examination Report under Section 18(3) for GB1805236.5 mailed from the Intellectual Property Office dated Apr. 1, 2021.
Examination Report under Section 18(3) for GB1805236.5 mailed from the Intellectual Property Office dated Mar. 24, 2022.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Gurcay et al.; "The Power of Social Influence on Estimation Accuracy"; Journal of Behavioral Decision Making; J. Behav. Dec. Making (2014); Published online in Wiley Online Library (wileyonlinelibrary.com); DOI:10.1002/bdm.1843; 12 pages (Year: 2014).
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Mathematics Libre Texts; "3.3: Power Functions and Polynomial Functions"; Accessed on Oct. 8, 2021 at https://math.libretexts.org/Bookshelves/Precalculus/Precalculus_(OpenStax)/03%3A_Polynomial_and_Rational_Functions/3.03%3A_Power_Functions_and_Polynomial_Functions (Year:2021); 12 pages.
Meyer; "Meet Loomio, The Small-Scale Decision-Making Platform With The Biggest Ambitions"; Mar. 13, 2014; https://gigaom.com/2014/03/13/meet-loomio-the-small-scale-decision-making-platform-wi . . . ; downloaded Mar. 25, 2015; 11 pages.

PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Puleston et al.; "Predicting the Future: Primary Research Exploring the Science of Prediction"; Copyright Esomar 2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; U.S. Appl. No. 17/024,580, filed Sep. 17, 2020.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and The Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=Eu-RyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.

(56) References Cited

OTHER PUBLICATIONS

Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/154,613, filed Oct. 8, 2018.
Rosenberg; U.S. Appl. No. 17/581,769, filed Jan. 21, 2022.
Rosenberg: U. S. U.S. Appl. No. 15/959,080, filed Apr. 20, 2018.
Salminen; "Collective Intelligence In Humans: A Literature Review"; Lappeenranta University of Technology, Lahti School of Innovation; 1Proceedings; 2012; 8 pages.
Search and Examination Report under Sections 17 & 18(3) for Application No. GB1805236.5 issued by the UK Intellectual Property Office dated Jan. 28, 2022.
Search Report under Section 17 for GB2202778.3 issued by the GB Intellectual Property Office dated Mar. 4, 2022.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Transforming Relationships; "Lottery: A tax on the statistically-challenged. "; Chapter 4, Sec 4.1; Accessed on Oct. 8, 2021 at http://www.henry.k12.ga.us/ugh/apstat/chaptemotes/sec4.1.html (Year:2021); 3 pages.
Unanimous A. I.; "What is Swarm Intelligence"; 2015; http://unu.ai/swarm-intelligence/; downloaded Oct. 6, 2016; 3 pages.
USPTO; Non-Final Office Action for U.S. Appl. No. 17/024,474 dated Oct. 12, 2021.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Examiner Interview Summary for U.S. Appl. No. 16/059,698 dated Feb. 2, 2021.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Final Office Action for U.S. Appl. No. 16/059,698 dated Dec. 31, 2020.
USPTO; Non-Final Office Action for U.S. Appl. No. 14/738,768 dated Sep. 8, 2017.
USPTO; Non-Final Office Action for U.S. Appl. No. 17/024,580 dated Nov. 23, 2021.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/898,468 dated Mar. 3, 2020.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/059,698 dated Jun. 8, 2020.
USPTO; Non-Final Office Action for U.S. Appl. No. 16/130,990 dated Oct. 21, 2019.
USPTO; Non-Final Office Action for U.S. Appl. No. 16/147,647 dated Jan. 27, 2020.
USPTO; Non-Final Office Action for U.S. Appl. No. 16/154,613 dated Aug. 20, 2021.
USPTO; Non-Final Office Action for U.S. Appl. No. 16/230,759 dated Mar. 26, 2020.
USPTO; Non-Final Office Action for U.S. Appl. No. 16/668,970 dated Aug. 15, 2017.
USPTO; Notice of Allowance for U.S. Appl. No. 16/154,613 dated Nov. 3, 2021.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/959,080 dated Jan. 31, 2020.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 15/898,468 dated May 1, 2020.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/059,698 dated Mar. 15, 2021.
USPTO; Notice of Allowance for U.S. Appl. No. 16/147,647 dated Mar. 18, 2020.
USPTO; Notice of Allowance for U.S. Appl. No. 16/230,759 dated Jul. 17, 2020.

(56) References Cited

OTHER PUBLICATIONS

USPTO; Notice of Allowance for U.S. Appl. No. 16/356,777 dated Jul. 22, 2020.
USPTO; Notice of Allowance for U.S. Appl. No. 16/904,239 dated Jun. 17, 2019.
USPTO; Notice of Allowance for U.S. Appl. No. 17/024,580 dated Apr. 12, 2022.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
USPTO: Notice of Allowance issued in U.S. Appl. No. 17/024,474 dated Apr. 11, 2022.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Willcox; U.S. Appl. No. 16/356,777, filed Mar. 18, 2019.
Willcox; U.S. Appl. No. 17/024,474, filed Sep. 17, 2020.
Willcox; U.S. Appl. No. 17/744,479, filed May 13, 2022.
Yeung et al.; "Metacognition in human decision-making: confidence and error monitoring"; Philosophical Transactions of the Royal Society B; 2012; pp. 1310-1321.

\* cited by examiner

What are the odds, Actor A wins the Oscar? ← 1600

What are the odds, Actor B wins the Oscar? ← 1602

What are the odds, Actor C wins the Oscar? ← 1604

What are the odds, Actor D wins the Oscar? ← 1606

What are the odds, Actor E wins the Oscar? ← 1608

HYPER-SWARM METHOD AND SYSTEM FOR COLLABORATIVE FORECASTING

This application is a continuation of U.S. application Ser. No. 17,024,580 entitled METHOD AND SYSTEM FOR AMPLIFYING COLLECTIVE INTELLIGENCE USING A NETWORKED HYPER-SWARM, filed Sep. 17, 2020, which is a continuation of U.S. application Ser. No. 16/230,759 entitled METHOD AND SYSTEM FOR A PARALLEL DISTRIBUTED HYPER-SWARM FOR AMPLIFYING HUMAN INTELLIGENCE, filed Dec. 21, 2018, now U.S. Pat. No. 10,817,158, which claims the benefit of U.S. Provisional Application No. 62/611,756 entitled Method and System for a Parallel Distributed Hyper-Swarm for Amplifying Human Intelligence, filed Dec. 29, 2017, which is a continuation-in-part of U.S. application Ser. No. 16/154,613 entitled INTERACTIVE BEHAVIORAL POLLING AND MACHINE LEARNING FOR AMPLIFICATION OF GROUP INTELLIGENCE, filed Oct. 8, 2018, now U.S. Pat. No. 11,269,502, claiming the benefit of U.S. Provisional Application No. 62/569,909 entitled INTERACTIVE BEHAVIORAL POLLING AND MACHINE LEARNING FOR AMPLIFICATION OF GROUP INTELLIGENCE, filed Oct. 9, 2017, which is a continuation-in-part of U.S. application Ser. No. 16/059,698 entitled ADAPTIVE POPULATION OPTIMIZATION FOR AMPLIFYING THE INTELLIGENCE OF CROWDS AND SWARMS, filed Aug. 9, 2018, now U.S. Pat. No. 11,151,460, claiming the benefit of U.S. Provisional Application No. 62/544,861, entitled ADAPTIVE OUTLIER ANALYSIS FOR AMPLIFYING THE INTELLIGENCE OF CROWDS AND SWARMS, filed Aug. 13, 2017 and of U.S. Provisional Application No. 62/552,968 entitled SYSTEM AND METHOD FOR OPTIMIZING THE POPULATION USED BY CROWDS AND SWARMS FOR AMPLIFIED EMERGENT INTELLIGENCE, filed Aug. 31, 2017, which is a continuation-in-part of U.S. application Ser. No. 15/922,453 entitled PARALLELIZED SUB-FACTOR AGGREGATION IN REAL-TIME SWARM-BASED COLLECTIVE INTELLIGENCE SYSTEMS, filed Mar. 15, 2018, claiming the benefit of U.S. Provisional Application No. 62/473,424 entitled PARALLELIZED SUB-FACTOR AGGREGATION IN A REAL-TIME COLLABORATIVE INTELLIGENCE SYSTEMS filed Mar. 19, 2017, which in turn is a continuation-in-part of U.S. application Ser. No. 15/904,239 entitled METHODS AND SYSTEMS FOR COLLABORATIVE CONTROL OF A REMOTE VEHICLE, filed Feb. 23, 2018, now U.S. Pat. No. 10,416,666, claiming the benefit of U.S. Provisional Application No. 62/463,657 entitled METHODS AND SYSTEMS FOR COLLABORATIVE CONTROL OF A ROBOTIC MOBILE FIRST-PERSON STREAMING CAMERA SOURCE, filed Feb. 26, 2017 and also claiming the benefit of U.S. Provisional Application No. 62/473,429 entitled METHODS AND SYSTEMS FOR COLLABORATIVE CONTROL OF A ROBOTIC MOBILE FIRST-PERSON STREAMING CAMERA SOURCE, filed Mar. 19, 2017, which is a continuation-in-part of U.S. application Ser. No. 15/898,468 entitled ADAPTIVE CONFIDENCE CALIBRATION FOR REAL-TIME SWARM INTELLIGENCE SYSTEMS, filed Feb. 17, 2018, now U.S. Pat. No. 10,712,929, claiming the benefit of U.S. Provisional Application No. 62/460,861 entitled ARTIFICIAL SWARM INTELLIGENCE WITH ADAPTIVE CONFIDENCE CALIBRATION, filed Feb. 19, 2017 and also claiming the benefit of U.S. Provisional Application No. 62/473,442 entitled ARTIFICIAL SWARM INTELLIGENCE WITH ADAPTIVE CONFIDENCE CALIBRATION, filed Mar. 19, 2017, which is a continuation-in-part of U.S. application Ser. No. 15/815,579 entitled SYSTEMS AND METHODS FOR HYBRID SWARM INTELLIGENCE, filed Nov. 16, 2017, now U.S. Pat. No. 10,439,836, claiming the benefit of U.S. Provisional Application No. 62/423,402 entitled SYSTEM AND METHOD FOR HYBRID SWARM INTELLIGENCE filed Nov. 17, 2016, which is a continuation-in-part of U.S. application Ser. No. 15/640,145 entitled METHODS AND SYSTEMS FOR MODIFYING USER INFLUENCE DURING A COLLABORATIVE SESSION OF REAL-TIME COLLABORATIVE INTELLIGENCE, filed Jun. 30, 2017, now U.S. Pat. No. 10,353,551, claiming the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, which is a continuation-in-part of U.S. application Ser. No. 15/241,340 entitled METHODS FOR ANALYZING DECISIONS MADE BY REAL-TIME COLLECTIVE INTELLIGENCE SYSTEMS, filed Aug. 19, 2016, now U.S. Pat. No. 10,222,961, claiming the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, which is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, claiming the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, which is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016, now U.S. Pat. No. 10,310,802, claiming the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, which is a continuation-in-part of U.S. patent application Ser. No. 15/052,876, filed Feb. 25, 2016, entitled DYNAMIC SYSTEMS FOR OPTIMIZATION OF REAL-TIME COLLABORATIVE INTELLIGENCE, now U.S. Pat. No. 10,110,664, claiming the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, which is a continuation-in-part of U.S. application Ser. No. 15/047,522 entitled SYSTEMS AND METHODS FOR COLLABORATIVE SYNCHRONOUS IMAGE SELECTION, filed Feb. 18, 2016, now U.S. Pat. No. 10,133,460, which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, which is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, which is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015, now U.S. Pat. No. 10,551,999, which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, which is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015, now U.S. Pat. No. 10,277,645, which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, which is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015, now U.S. Pat. No. 10,122,775, which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, which is a continuation-in-part of U.S. patent application Ser. No. 14/738,768 entitled INTUITIVE INTERFACES FOR REAL-TIME COLLABORATIVE INTELLIGENCE, filed Jun. 12, 2015, now U.S. Pat. No. 9,940,006, which in turn claims the benefit of U.S. Provisional Application 62/012,403 entitled INTUITIVE INTERFACE FOR REAL-TIME COLLABORATIVE CONTROL, filed Jun. 15, 2014, which is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, which is a continuation-in-part of U.S. patent application Ser. No. 14/668,970 entitled METHODS AND SYSTEMS FOR REAL-TIME COLLABORATIVE INTELLIGENCE, filed Mar. 25, 2015, now U.S. Pat. No. 9,959,028, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

BACKGROUND OF THE INVENTION

1. Field of the Invention

The present invention relates generally to systems and methods for harnessing and amplifying the combined intelligence of distributed human populations. In particular, this invention relates to enabling networked human groups to form real-time systems that deliberate and then converge on optimized solutions to problems posed to the group, especially forecasting problems.

2. Discussion of the Related Art

The aggregation of insights from large groups of people has been shown to amplify intelligence (i.e. increase accuracy). Sometimes called the Wisdom of Crowds, these methods generally use statistical averaging across a static set of data collected from a population through survey-based polling. While such methods have shown amplifications of intelligence, a significant problem with all common Wisdom of Crowd methods is that human participants are very poor at expressing their internal feelings in a consistent and repeatable manner that can be aggregated across populations. People vary wildly in the level of confidence (or conviction) they have in their reported answers, and their internal scales for reporting measures of confidence are non-linear and very different from person to person. Simply put, people are highly inconsistent at "self-reporting" their internal thoughts, insights, intuitions, estimation, and opinions on surveys in way that captures the magnitude of their confidence or conviction such that it can be effectively aggregated across populations. The present invention re-invents the polling process by enabling groups to adjust their individual forecasts with guidance from other individuals, thereby enabling internal confidence scales to converge on common metrics. Unlike other systems that enable feedback (like prediction markets) which enable interactions in series (one after the other), the current invention enables all participants to gain feedback in parallel. This enables a true "Hive Mind" to emerge, similar to swarms in nature, eliminating the flaw of market-based systems—serialized data which drives bubbles, busts, and momentum overshoots. In addition, machine learning is employed in multiple steps in the process to (a) optimize the initial estimates by curating the population, and (b) to optimize the weighting of estimates based on human behaviors. By enabling the capture of real-time dynamic behavioral data, the methods and systems disclosed here enable a more accurate and more consistent model of user confidence and conviction than traditional reporting. And finally, an innovative architecture is disclosed which enables a single large population (for example 1000 participants) to be divided into a large number of unique sub-populations, which each converge on sub-estimates in parallel. This greatly increases accuracy by eliminating the possibility that all participants are updating their estimates (and expressing behaviors) based on the same population data.

SUMMARY OF THE INVENTION

Several embodiments of the invention advantageously address the needs above as well as other needs by providing a method for computer-moderated collaborative forecasting among a population of human participants using a plurality of networked computing devices, the method comprising: providing a collaboration server running a collaboration application, the collaboration server in communication with the plurality of the networked computing devices, each computing device associated with one member of the population of human participants; providing a local forecasting application on each networked computing device, the local forecasting application configured for displaying forecasting information to and collecting forecasting input from the one member associated with that networked computing device; and enabling through communication between the collaboration application running on the collaboration server and the local forecasting applications running on each of the plurality of networked computing devices, the following stepssend a forecasting query to the plurality of networked computing devices, the forecasting query describing a future event to be collaboratively predicted by the population of human participants; present, at substantially the same time, a representation of the forecasting query to each member of the population of human participants on a display of the computing device associated with that member; collect an initial forecast response from each member of the population of human participants via a user interface on the computing device associated with that member; store a set of initial forecast responses from the population of human participants in a memory accessible by the collaboration server; identify a plurality of unique overlapping subsets of initial forecast responses from the set of initial forecast responses, each overlapping subset sharing at least one data point with another overlapping subset; display, at substantially the same time, a different unique overlapping subset of initial forecast responses to each member of the population of human participants on the computing device associated with that member, thereby enabling that member to consider the initial forecasts responses provided by a different unique subset of human participants from the full population of human participant; collect an updated forecast response from each member of the population of human participants via a user interface on the computing device associated with that member; store a set of updated forecast responses from the population of human participants in a memory accessible by the collaboration server; and compute a final collaborative forecast based at least in part upon the set of initial forecast responses and the set of updated forecast responses, the collaborative forecast providing an answer to the forecasting query.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
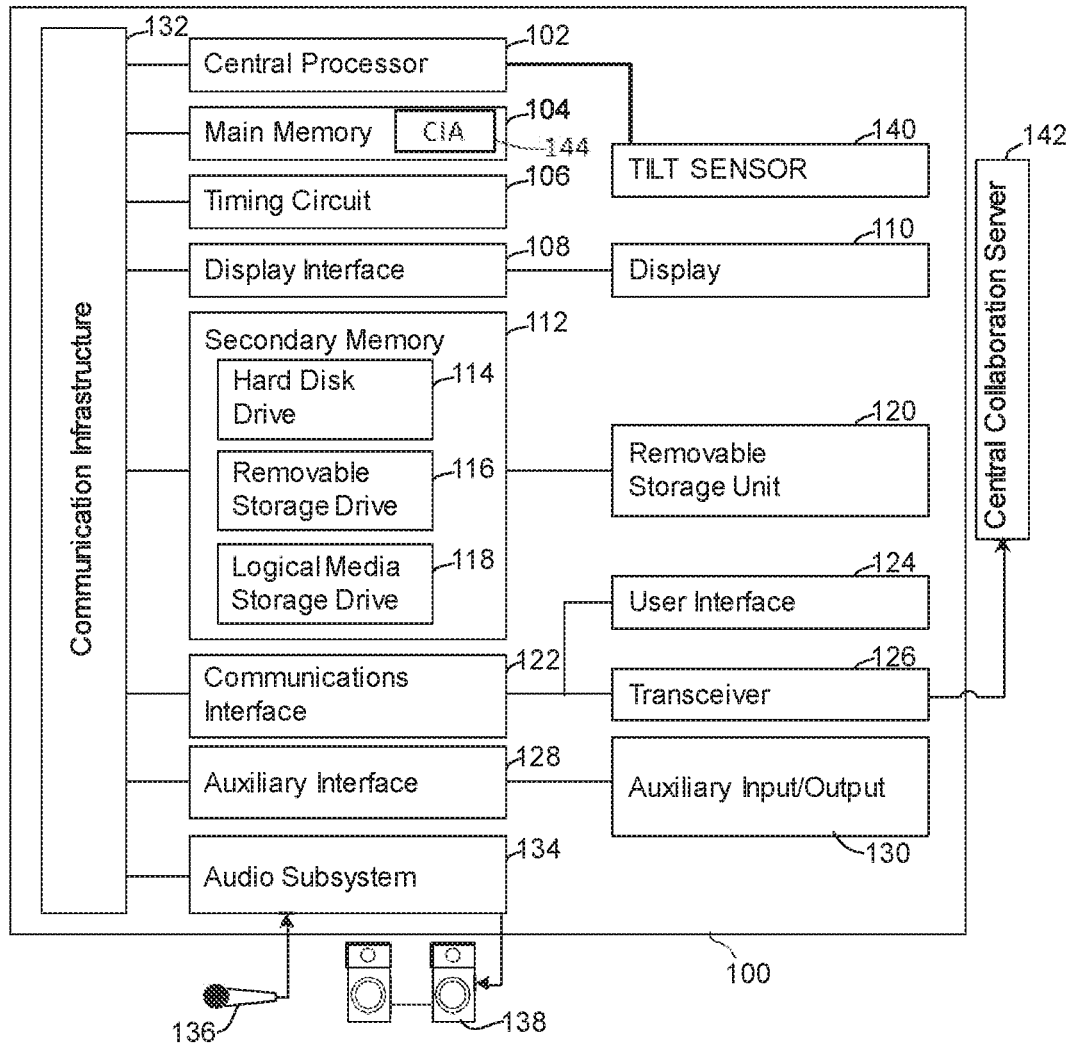
FIG. 1 is a schematic diagram of an exemplary computing device configured for use in a collaboration system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Real-time occurrences as referenced herein are those that are substantially current within the context of human perception and reaction.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Historical research demonstrates that the insights generated by groups can be more accurate than the insights generated by individuals in many situations. A classic example is estimating the number of beans in a jar. Many researchers have shown that taking the statistical average of estimates made by many individuals will yield an answer that is more accurate than the typical member of the population queried. There are three basic categories of population-based data aggregation systems: polls, markets, and swarms. Traditional Polls treat all individuals as isolated data-points, the only interaction among participants is statistical, when a researcher processes the data after-the-fact and computes an aggregated result. Polling has been shown to amplify the intelligence of a population to a moderate level. A significant drawback of traditional polling is that there is no interaction between participants to enable them to adjust their beliefs and/or confidence levels based upon insights gained from others. To solve this, Sequential Polls have been deployed where participants can see the results of the poll before they respond. This has been shown to reduce accuracy because each individual is influenced by the people who came before them, resulting in amplified social influence bias. This is often described as an asymmetric herding effect which makes users overcompensate for negative ratings but amplify positive ones, accumulating in bubble that distorts results by over 30%. This phenomenon was first described in a paper written by Lev Muchnik, Sinan Aral and Sean J. Taylor in 2014. Similar to traditional polls, prediction markets are structured in series, causing each transaction to influence the next transaction. This too, causes significant distortions to the collective intelligence that can be extracted from a population, resulting in asymmetric momentum which leads to bubbles and busts.

To solve this problem, an alternate method of aggregation has been developed and deployed called "swarming" wherein all participants provide input in parallel (not series), enabling people to benefit from the insights of others without as pronounced as herding effect. A problem with current swarming technologies is that (a) computational burden limits the size of swarms, (b) the highly interactive nature of the interface limits deployment on small screens like phones, and (c) the real-time nature limits the opportunity of individuals to research the questions posed and consider response carefully. The present invention, referred to herein as a Hyper-Swarm solves these problems by building a hybrid system that falls between a market and a swarm, turning a market in a parallel aggregation system (instead of serial aggregation) thereby eliminating herding effects caused by social bias, while maintaining the group-wise interactions that make swarms so powerful. In addition, the present invention enables a large population to be broken into a large set of "sub-swarms", defined as interactive groups that benefit from the insights of others.

Collaborative Intelligence Systems and Methods

Systems and methods for general collaborative swarm intelligence are disclosed in the related applications incorporated by reference. Select disclosure from related applications is included in this section to aid in understanding of the present invention. It will be understood that this section is meant to give a general background only and not all parts of this general collaborative intelligence (swarm) systems and methods section are directly applicable to the present invention.

As described in related U.S. Pat. No. 9,959,028 for METHODS AND SYSTEMS FOR REAL-TIME CLOSED-LOOP COLLABORATIVE INTELLIGENCE, by the present inventor, and incorporated by reference, a swarm-based system and methods have been developed that enable groups of users to collaboratively control the motion of a graphical pointer through a unique real-time closed-loop control paradigm. In some embodiments, the collaboratively controlled pointer is configured to empower a group of users to choose letters, words, numbers, phrases, and/or other choices in response to a prompt posed simultaneously to the group. This enables the formation a group response that's not based on the will of any individual user, but rather on the collective will of the group. In this way, the system disclosed herein enables a group of people to express insights as a unified intelligence, thereby making decisions, answering questions, rendering forecasts, and making predictions as an artificial swarm intelligence.

As described in U.S. patent application Ser. No. 14/708,038 for MULTI-GROUP METHODS AND SYSTEMS FOR REAL-TIME MULTI-TIER COLLABORATIVE INTELLIGENCE, by the current inventor and incorporated by reference, additional systems and methods have been disclosed that encourage groups of real-time users who are answering questions as a swarm to produce coherent responses while discouraging incoherent responses. A number of methods were disclosed therein, including (a) Coherence Scoring, (b) Coherence Feedback, and (c) Tiered Processing. These and other techniques greatly enhance the effectiveness of the resulting intelligence.

As described in U.S. patent application Ser. No. 14/859,035 for SYSTEMS AND METHODS FOR ASSESSMENT AND OPTIMIZATION OF REAL-TIME COLLABORATIVE INTELLIGENCE SYSTEMS, by the present inventor and incorporated by reference, a system and methods have been developed for enabling artificial swarms to modify its participant population dynamically over time, optimizing the performance of the emergent intelligence by altering its population makeup and/or the altering the relative influence of members of within that population. In some such embodiments the members of a swarm can selectively eject one or more low performing members of that swarm (from the swarm), using the group-wise collaborative decision-making techniques herein. As also disclosed, swarms can be configured to dynamically adjust its own makeup, not by ejecting members of the swarm but by adjusting the relative weighting of the input received from members of the swarm. More specifically, in some embodiments, algorithms are used to increase the impact (weighting) that some users have upon the closed-loop motion of the pointer, while decreasing the impact (weighting that other users have upon the closed-loop motion of the pointer. In this way, the swarm intelligence is adapted over time by the underlying algorithms disclosed herein, strengthening the connections (i.e. input) with respect to the more collaborative users, and weakening the connections with respect to the less collaborative users.

One thing that both poll-based methods and swarm-based methods have in common when making predictions, is that a smarter population generally results in a smarter Collective Intelligence. As described in U.S. patent application Ser. No. 16/059,658 for ADAPTIVE POPULATION OPTIMIZATION FOR AMPLIFYING THE INTELLIGENCE OF CROWDS AND SWARMS, by the present inventor and incorporated by reference, methods and systems are disclosed that enables the use of polling data to curate a refined population of people to form an emergent intelligence. While this method is highly effective, by enabling dynamic behavioral data in the polling process, far deeper and more accurate assessments of human confidence and human conviction are attained and used to significantly improve the population curation process. Specifically, this enables higher accuracy when distinguishing members of the population of are likely to be high-insight performers on a given prediction task as compared to members of the population who are likely to be low-insight performers on a given prediction task, and does so without using historical data about their performance on similar tasks.

Referring first to FIG. 1, as previously disclosed in the related patent applications, a schematic diagram of an exemplary portable computing device 100 configured for use in the collaboration system is shown. Shown are a central processor 102, a main memory 104, a timing circuit 106, a display interface 108, a display 110, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, a central collaboration server 142, and a collaborative intent application 144.

Each of a plurality of portable computing devices 100, each used by one of a plurality of users (the plurality of users also referred to as a group), is networked in real-time to the central collaboration server (CCS) 142. In some embodiments, one of the portable computing devices 100 could act as the central collaboration server 142. For the purposes of this disclosure, the central collaboration server 142 is its own computer system in a remote location, and not the portable computing device 100 of one of the users. Hence the collaboration system is comprised of the centralized central collaboration server 142 and the plurality of portable computing devices 100, each of the portable computing devices 100 used by one user.

The portable computing device 100 may be embodied as a handheld unit, a pocket housed unit, a body worn unit, or other portable unit that is generally maintained on the person of a user. The portable computing device 100 may be wearable, such as transmissive display glasses.

The central processor 102 is provided to interpret and execute logical instructions stored in the main memory 104. The main memory 104 is the primary general purpose storage area for instructions and data to be processed by the central processor 102. The main memory 104 is used in the broadest sense and may include RAM, EEPROM and ROM. The timing circuit 106 is provided to coordinate activities within the portable computing device 100. The central processor 102, main memory 104 and timing circuit 106 are directly coupled to the communications infrastructure 132. The central processor 102 may be configured to run a variety of applications, including for example phone and address book applications, media storage and play applications, gaming applications, clock and timing applications, phone and email and text messaging and chat and other communication applications. The central processor 102 is also configured to run at least one Collaborative Intent Application (CIA) 144. The Collaborative Intent Application 144 may be a standalone application or may be a component of an application that also runs upon other networked processors.

The portable computing device 100 includes the communications infrastructure 132 used to transfer data, memory addresses where data items are to be found and control signals among the various components and subsystems of the portable computing device 100.

The display interface 108 is provided upon the portable computing device 100 to drive the display 110 associated with the portable computing device 100. The display interface 108 is electrically coupled to the communications infrastructure 132 and provides signals to the display 110 for visually outputting both graphics and alphanumeric characters. The display interface 108 may include a dedicated graphics processor and memory to support the displaying of graphics intensive media. The display 110 may be of any type (e.g., cathode ray tube, gas plasma) but in most circumstances will usually be a solid state device such as liquid crystal display. The display 110 may include a touch screen capability, allowing manual input as well as graphical display.

Affixed to the display 110, directly or indirectly, is the tilt sensor 140 (accelerometer or other effective technology) that detects the physical orientation of the display 110. The tilt sensor 140 is also coupled to the central processor 102 so that input conveyed via the tilt sensor 140 is transferred to the central processor 102. The tilt sensor 140 provides input to the Collaborative Intent Application 144, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 118 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 120 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the portable computing device 100 and the means by which the portable computing device 100 conveys information to the user. In some embodiments the user interface 124 is controlled by the CIA 144 and is configured to display information regarding the group collaboration, as well as receive user input and display group output.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the portable computing device 100 and the Central Collaboration Server 142. The transceiver 126 could also be used to enable communication among a plurality of portable computing devices 100 used by other participants. In some embodiments, one of the portable computing devices 100 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the portable computing devices 100 establish an ad hock network between and among them, as with a BlueTooth® communication technology.

It should be noted that any prevailing wireless communication standard may be employed to enable the plurality of portable computing devices 100 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may issue a suggestion as a verbal utterance. The portable computing device 100 may then capture the verbal utterance, digitize the utterance, and convey the utterance to other of said plurality of users by sending it to their respective portable computing devices 100 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their portable electronic devices 100 and taking advantage of the tallying, processing, and electronic decision determination and communication processes disclosed herein. In this way the system may act as a supportive supplement that is seamlessly integrated into a direct face to face conversation held among a group of users.

For embodiments that do include the microphone 136, it may be incorporated within the casing of the portable computing device 100 or may be remotely located elsewhere upon a body of the user and is connected to the portable computing device 100 by a wired or wireless link. Sound signals from microphone 136 are generally captured as analog audio signals and converted to digital form by an analog to digital converter or other similar component and/or process. A digital signal is thereby provided to the processor 102 of the portable computing device 100, the digital signal representing the audio content captured by microphone 136. In some embodiments the microphone 136 is local to the headphones 138 or other head-worn component of the user. In some embodiments the microphone 136 is interfaced to the portable computing device 100 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the portable computing device 100 by the Bluetooth® communication link.

The portable computing device 100 includes an operating system, the necessary hardware and software drivers necessary to fully utilize the devices coupled to the communications infrastructure 132, media playback and recording applications and at least one Collaborative Intent Application 144 operatively loaded into main memory 104, which is designed to display information to a user, collect input from that user, and communicate in real-time with the Central Collaboration Server 142. Optionally, the portable computing device 100 is envisioned to include at least one remote authentication application, one or more cryptography applications capable of performing symmetric and asymmetric cryptographic functions, and secure messaging software. Optionally, the portable computing device 100 may be disposed in a portable form factor to be carried by a user.

Figure 2:
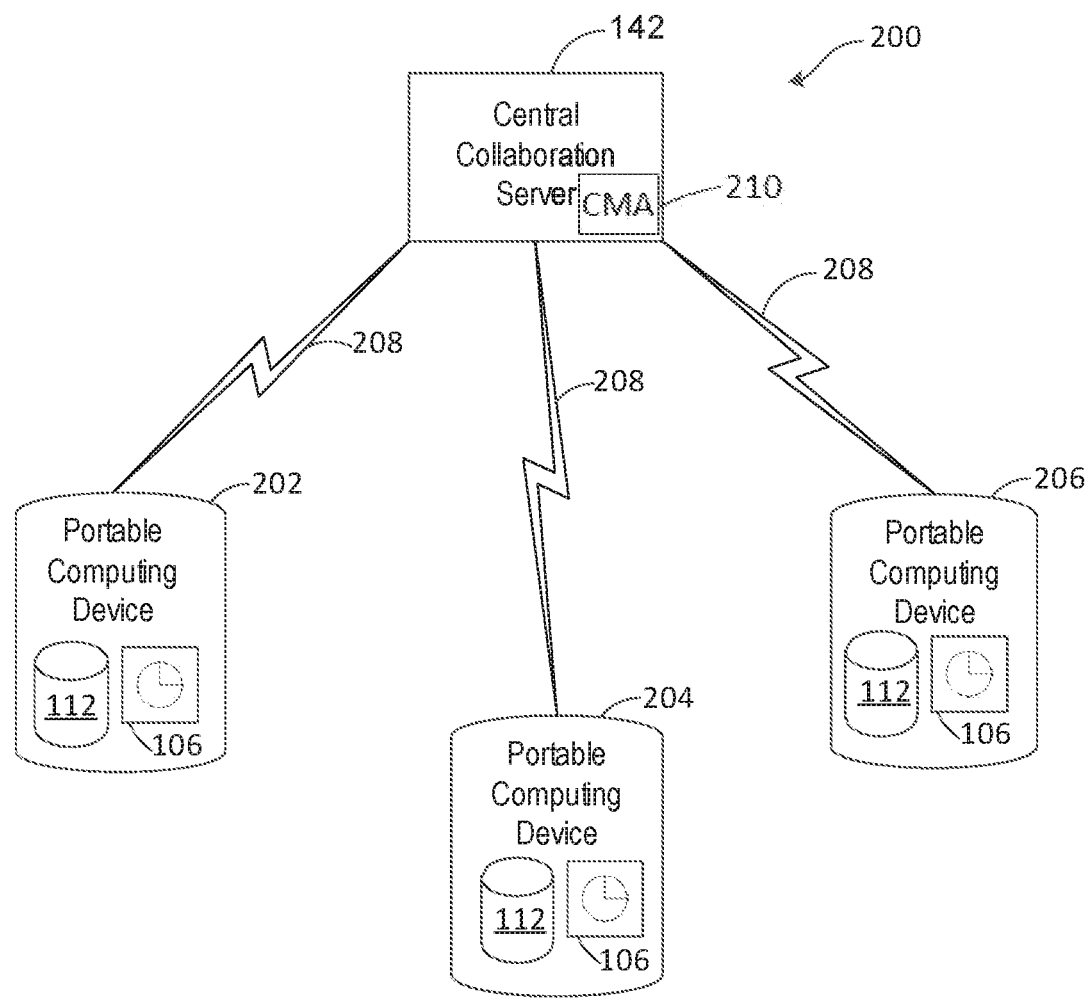
FIG. 2 is a schematic diagram of an exemplary real-time collaboration system.

Referring next to FIG. 2, an exemplary collaboration system 200 is shown. Shown are the central collaboration server 142, a plurality of the secondary memory subsystems 112, a plurality of the timing circuits 106, a first portable computing device 202, a second portable computing device 204, a third portable computing device 206, and a plurality of exchanges of data 208.

The group of users (participants), each using one of the plurality of portable computing devices 100, each portable computing device 100 running the Collaborative Intent Application 144, each device 100 in communication with the Central Collaboration Server 142, may engage in the collaborative experience that evokes a collective intelligence (also referred to as Collective Consciousness).

As shown in FIG. 2, the CCS 142 is in communication with the plurality of portable computing devices 202, 204, 206. Each of these devices 202, 204, 206 is running the Collaborative Intent Application (CIA) 144. In one example, each of the devices 202, 204, 206 is an iPad® running the CIA 144, each iPad® communicating with the CCS 142 which is running a Collaboration Mediation application (CMA) 210. Thus, we have the local CIA 144 on each of the plurality of devices 202, 204, 206, each device 202, 204, 206 in real-time communication with the CMA running on the CCS 142. While only three portable devices 202, 204, 206 are shown in FIG. 2 for clarity, in ideal embodiments, dozens, hundreds, thousands, or even millions of devices 100 would be employed in the collaboration system 200. Hence the CCS 142 must be in real-time communication with many devices 100 at once.

The communication between the CCS 142 and each of the devices 202, 204, 206 includes the exchanges of data 208. The data has a very significant real-time function, closing the loop around each user, over the intervening electronic network.

As described above, the system 200 allows the group of users, each using their own tablet or phone or other similar portable computing device 100, to collaboratively answer questions in real-time with the support of the mediating system of the CCS 142 which communicates with the local CIA 144 running on each device 100. The Collaborative Intent Application 144 ties each device 100 to the overall collaborative system 200. Multiple embodiments of the CIA 144 are disclosed herein. The Collaborative Intent Application (CIA) 144 may be architected in a variety of ways to enable the plurality of portable computing devices 100 to engage in the collaborative processes described herein, with the supportive use of the Central Collaboration Server 142.

In some embodiments the exchange of data 208 may exist between portable computing devices 100.

Figure 3:
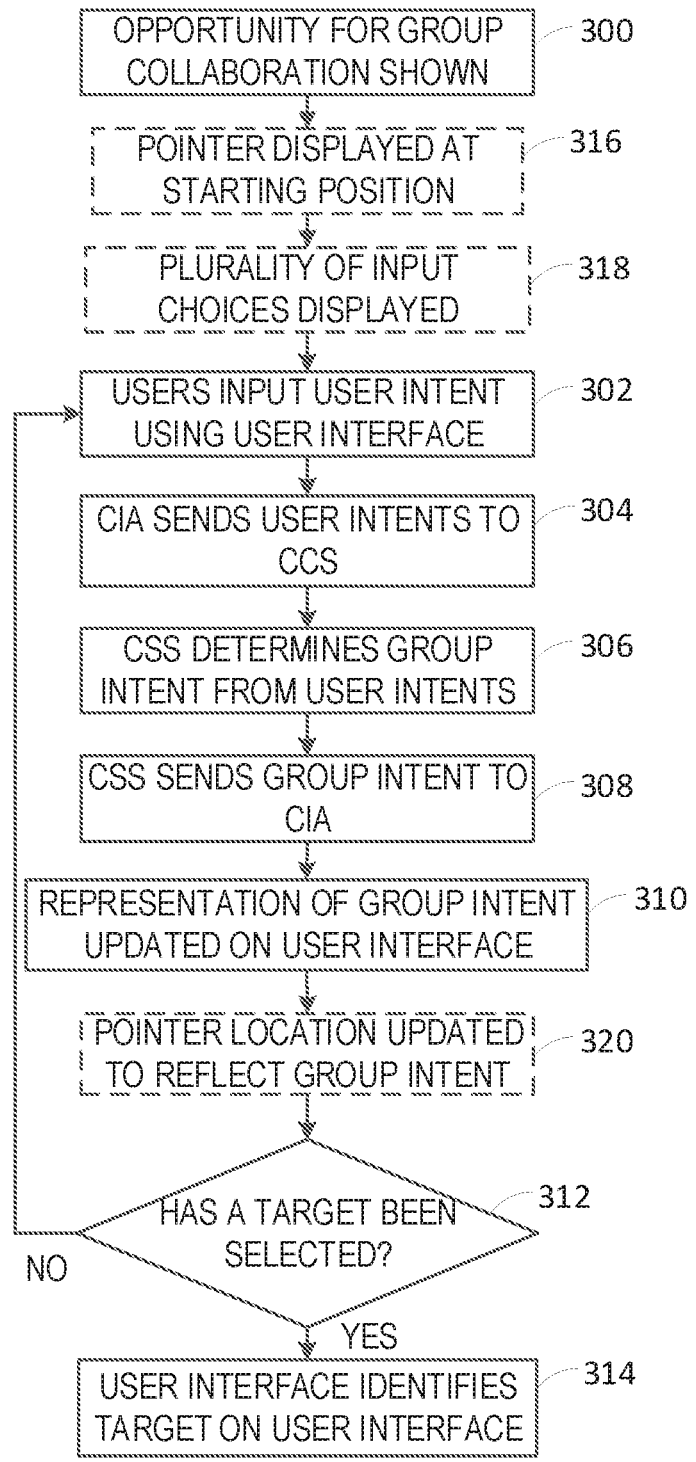
FIG. 3 is a flowchart of an exemplary group collaboration process using the collaboration system.

Referring next to FIG. 3, a flowchart of one embodiment of a group collaboration process is shown. Shown are a collaboration opportunity step 300, a user input step 302, a send user intents to CCS step 304, a determine group intent step 306, a send group intent to CIA step 308, a display intents step 310, a target selection decision point 312, and a display target step 314. The process also includes optional steps that could be included, for example, for a pointer graphical embodiment: a display pointer start position step 316, a display input choices step 318, and an update pointer location step 320. In the collaboration opportunity step 300, the CIA 144 receives the group collaboration opportunity from the CCS 142 and displays the opportunity on the display 110 of the portable computing device 100 (PCD). The group collaboration opportunity may be a question to be answered, for example, "What film will win the Best Picture in the Academy Awards?" or "Who will win the Super Bowl?" The process then proceeds to the user input step 302. The user input step 302 includes the user using the display 110 of the computing device 100 to input the user intent. The user intent is an input interpreted by the user interface 124 as a desired vector direction conveying an intent of the user. In some embodiments (described in the related applications), the user intent is a desired vector direction of a graphical pointer of the user interface 124, and the user input includes swiping of the pointer via the touchscreen interface. The user input step 302 takes place for each user of the group. The process then proceeds to the send user intent to CCS step 304.

In the send user intent to CCS step 304, the CIA 144 for each PCD 100 sends the user intent to the CCS 142. In the next step, the determine group intent step 306, the CCS 142 determines a collective group intent based on the plurality of user intents. The group intent may be determined through various methods, as described further below. The process then proceeds to the send group intent to CIA step 308.

In the embodiment including the optional steps display pointer start position 316 and the display input choices step 318, in the display pointer start position step 316 the graphical user interface 124 would display the starting, or neutral, position of a pointer chosen to indicate the graphical representation of the group intent. In the following step, the display input choices step 318, the user interface 124 would display a plurality of input choices 412 available to be selected by the group intent by using the pointer. The user intent in this embodiment is an input interpreted by the user interface 124 as representing that user's desired motion of the collaborative graphical pointer with respect to the plurality of input choices.

In the send group intent to CIA step 308, the CIA 144 receives the group intent from the CCS 142. Next, in the display intents step 310, for each computing device 100 the received representation of the group intent is displayed, along with a representation of the user intent originally input by the user of the computing device 100. The process then proceeds to the target selection decision point 312.

The update pointer location step 320 may be inserted between the display intents step 310 and the target selection decision point 312. In the update pointer location step 320, in the embodiments including the pointer the user interface 124 updates to indicate the current location of the pointer in response to the received group intent.

In the target selection decision point 312, if the group intent received corresponds to selection of the target (in some embodiments, from among the input choices), the process proceeds to the display target step 314, and the selected target is displayed on the display 124. If the group intent has not selected the target, the process returns to the user input step 302, and the process repeats until the target is determined by the group intent or until the process is otherwise ended (for example, by a time limit).

After the target has been chosen by the group intent, the entire process may repeat, for example, to form a word if each consecutive target is an alphabetic character.

Referring again to FIGS. 1, 2 and 3, the collaboration system in one embodiment as previously disclosed in the related applications employs the CCS 142 that users connect to via their portable computing device 100. In some embodiments, fixed or non-portable computing devices 100 can be used as well. In many embodiments, users choose or are assigned a username when they log into the CCS 142, thus allowing software on the CCS 142 to keep track of individual users and assign each one a score based on their prior sessions. This also allows the CCS 142 to employ user scores when computing the average of the group intent of all the users (in embodiments that use the average).

In general, when the session is in progress, the question is sent from the CCS 142 to each of the CIA 144 on the portable computing devices 100 of the users. In response to the question, the users convey their own intent either by manipulating an inner puck of the pointer, as described in the related applications, or by using a tilt or swipe input or other user interface methods. In some embodiments, the user's intent is conveyed as a direction and a magnitude (a vector) that the user wants the pointer to move. This is a user intent vector and is conveyed to the CCS 142. In some embodiments, the magnitude of the user intent vector is constant. The CCS 142 in some embodiments computes the numerical average (either a simple average or a weighted average) of the group intent for the current time step. Using the numerical average, the CCS 142 updates for the current time step the graphical location of the pointer within a target board displayed on the display 110. This is conveyed as an updated coordinate location sent from the CCS 142 to each of the CIA 144 of participating users on their own devices 100. This updated location appears to each of the users on their individual devices 100. Thus they see the moving pointer, ideally heading towards an input choice on the target board. The CCS 142 determines if and when the input choice is successfully engaged by the pointer and if so, that target is selected as an answer, or as a part of the answer (a single letter or space or punctuation mark, for example, that's added to an emerging answer). That target is then added to the emerging answer, which is sent to all the devices 100 and appears on each display 110.

While FIG. 3 illustrates one embodiment of the collaborative process, as shown in the related applications, many variations of the basic process are contemplated by the inventor.

Parallel Distributed Interactive Forecasting and Machine Learning

Human participants possess deep insights across a vast range of topics, having knowledge, wisdom, and intuition that can be harnesses and combined to build an emergent collective intelligence. A significant problem, however, people are bad at reporting the sentiments inside their heads and are even worse at expressing their relative levels of confidence and/or conviction in those sentiments. Reports from human participants are inconsistent from trial to trial, using scales that are highly non-linear, and highly inconsistent from participant to participant. To solve this problem, innovative methods and systems have been developed which expose participants to beliefs of other participants and allows them to adjust their input, enabling the software system to monitor how participants "behave" when making such adjustments. This behavioral data is collected and processed which gives far deeper insights into the true sentiments of human participants, as well as far deeper insights into the confidence and/or conviction that go with the expressed sentiments. In addition, an innovative method of building sub-populations (referred to herein as sub-swarms) has been developed to ensure that the population is being exposed to a diverse range of stimuli when making their adjustments, not all viewing the same stimuli. This further eliminates social biasing effects (i.e. herding) that could result from all participants being given the same global view of population beliefs.

Unlike prediction markets and sequential polls, which are serial in nature, and rely on participants showing up at a website (or other interface) to enter data by answering poll questions or engaging in market transactions, the Hyper-Swarm in preferred embodiments is structured as a PUSH system, meaning that participants are pushed a notification or other signal that informs them that a stage of the process is now active, and they have a certain time window to enter their data. This ensures that all participants are active synchronously. In some embodiments, the process is staged as a set of defined intervals. In some embodiments, real-time interaction is enabled. The real-time process is a true swarm, while the staged process is a simplified approximation of an actual swarm. While the real-time process is the preferred embodiment, this system will be described below first as a staged process (iterative steps) because it's simpler, then will be described as a real-time embodiment.

A good way to describe the systems and methods enabled by the hardware and software disclosed herein is by example. We use a sports prediction example because it's easy to explain, although the same methods and systems can be used for financial predictions, political predictions, and other types of forecasts. The same methods and systems can also be used for capturing and amplifying the accuracy of subjective sentiments, such as views and opinions of a population. In the example used herein, the objective is to predict football games, forecasting both the winner of the game and the number of points the winner wins by. In this example, a set of 15 games will be forecast by a population of 1000 participant, with the objective of aggregating the data from the 1000 participants to generate the most accurate group forecast possible. Traditionally, this would be done by asking a single question and capturing static data, which has all the problems described above, or by using a serial prediction market, which is subject to significant herding effects. In the inventive system and method, a parallel process using a unique interface, unique prompts, and unique timer, and a unique machine learning process. The example we will use is a single sports game:

Who will win the 49ers or the Raiders, and by how many points?

The system is designed to capture forecast data from a diverse human population on a given question (the above being just one example question) and process the input provided to output an aggregate forecast that is significantly more accurate than a traditional poll, sequential poll, or prediction market. Two unique embodiments are described, first a two-step iterative embodiment, then a real-time interaction embodiment. Both embodiments employ unique methods for capturing not just a forecast, but confidence levels in the forecast. Confidence is captured by self-reporting, but computed by the system using both self-reporting data and by behavioral analysis.

Figure 4:
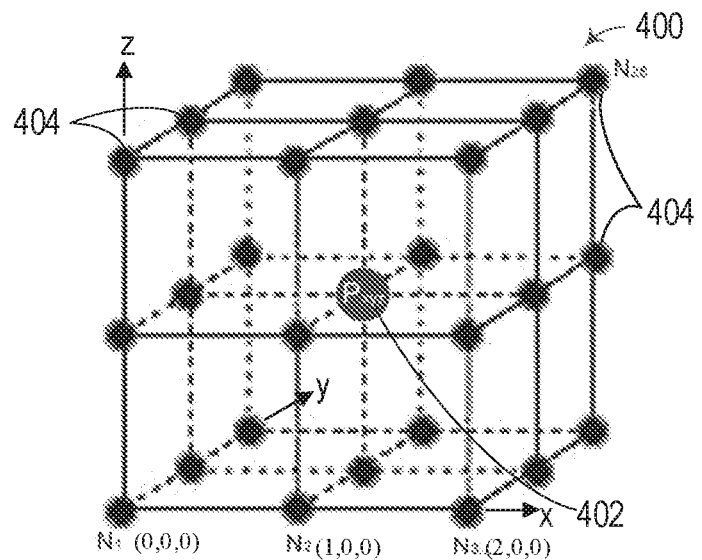
FIG. 4 is a schematic representation of an exemplary 3D grid hyper-swarm participant data structure.

Referring next to FIG. 4, a schematic representation of a 3D grid hyper-swarm participant data structure 400 is shown. The data structure 400 is aligned with the coordinate x-, y-, and z-axes, as shown in FIG. 4.

For reasons that will become clear below, one of the preferred data structures for a hyper-swarm is a 3D grid of participants, such that each participant P is associated with a unique x,y,z coordinate within the grid. Ideally the grid is structured into a finite cube of grid points, and treated such that opposite faces of the cube are adjacent (i.e. if you traveled off the edge of one face you would enter the opposite face). This means that any participants who is assigned an x,y,z coordinate within the grid, has 26 neighbors within the grid. This is illustrated in FIG. 4, showing a selected participant $P_{xyz}$ 402 as a large circle in the center of the grid, and the 26 smaller circles ($N_1$ to $N_{26}$) located on grid intersections indicating participant neighbors 404.

Figure 5:
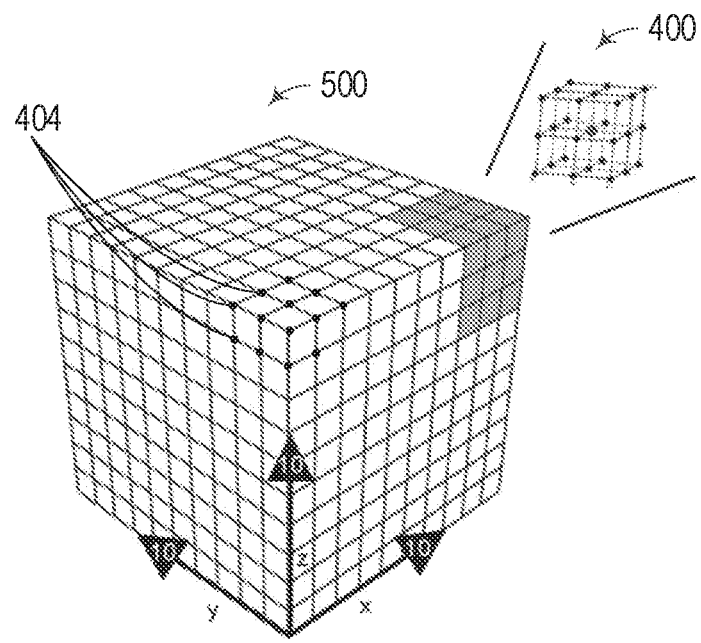
FIG. 5 is an illustration of an exemplary grid-arranged population participants.

This means that if the full population were 1000 participants, the participants would be arranged such that each is assigned an XYZ coordinate on a 10×10×10 grid. And with opposite faces being treated as adjacent, every participant of the 1000 participants has 26 neighbors. In addition, we define each unique group of 27 participants ($P_{xyz}$ plus his or her 26 neighbors) as a sub-swarm of the full population. This means there are 1000 unique Sub-swarms $S_1$ to $S_{1000}$, each with 27 participants, such that every sub-swarm overlaps with 26 other sub-swarms. An exemplary illustration of a grid-arranged population 500 of 1000 participants with a single sub-swarm 502 highlighted is shown in FIG. 5. A participant 404 is located at each grid intersection, although for clarity not all participants are indicated on FIG. 5. It's important to note that alternate data-structures can be used to enable hyper-swarms that are consistent with the present invention. For example, another structure, referred to herein as a Nearest Neighbor Model each of N participants are assigned a unique index in the range 1 through N, and each participant is grouped with S other participants that have the closest indexes to them where S is a value that modulates the size of sub-swarms. For example, there might be 1000 participants (N=1000) and we might desire to have sub-swarms such that there are 50 participants in each (S=50). Thus, in this example, each of 1000 participants is assigned a unique index of 1 through N and is uniquely grouped with the 50 other participants that have the closest indexes to them.

Another structure, referred to herein as a Small-World Connectivity Model is defined in two steps. First, a Nearest Neighbor Model is defined as described above wherein each of N participants are assigned a unique index in the range 1 through N, and each participant is grouped with S other participants that have the closest indexes to them. Then, a randomization process is used to adjust some members of each unique sub-swarm such that they have indices that fall outside the nearest neighbor range. In one such Small-World model, the randomization algorithm re-assigns connections between users with 20% probability. By this we mean, one fifth of the members of each sub-swarm are randomly replaced by members who fall outside of the index range defined by the S other participants that have the closest index. This enables a highly efficient transfer of information throughout the 1000 participant population.

Figure 6:
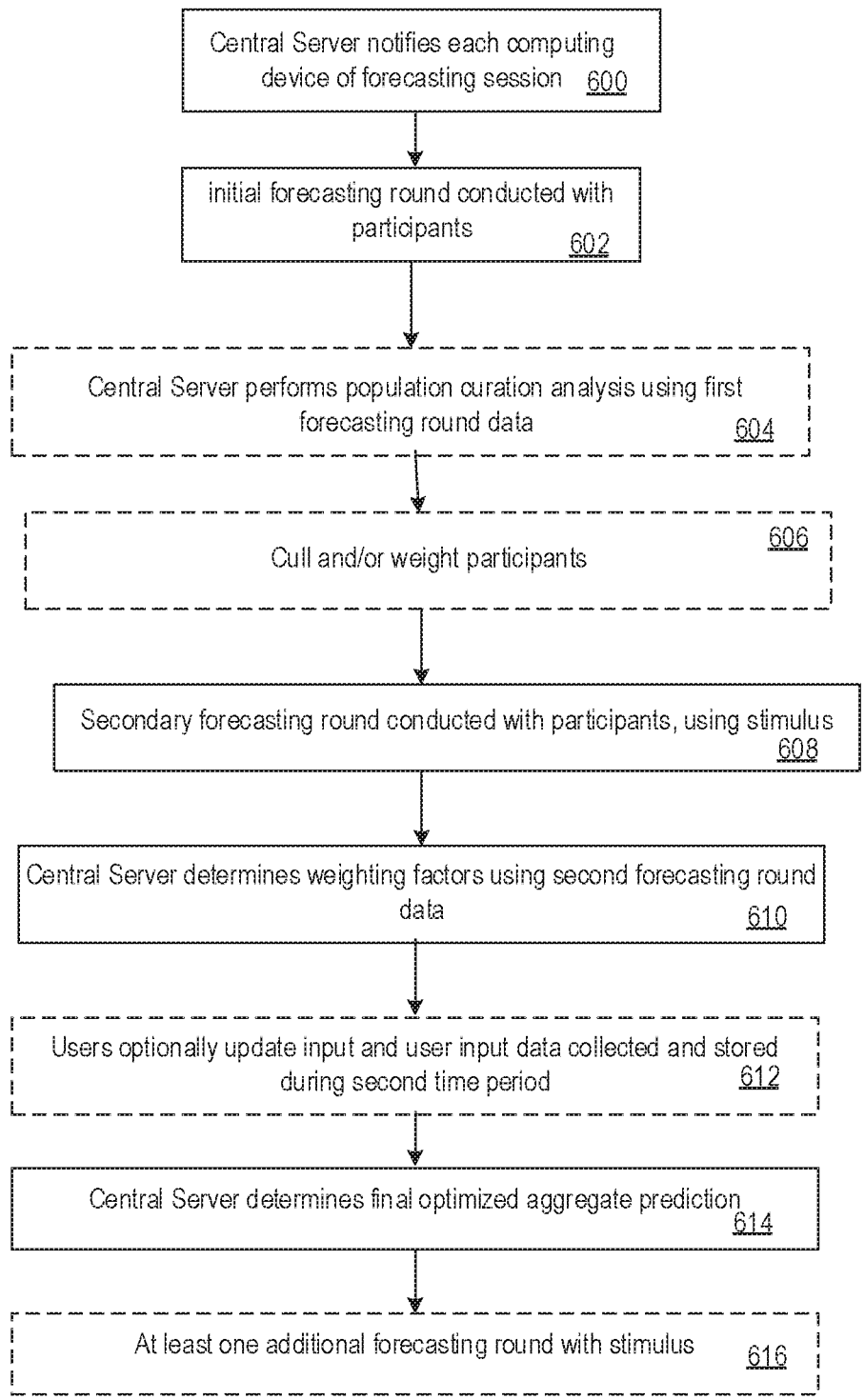
FIG. 6 is a flowchart for a Hyper-Swarm Iterative Approximation Embodiment method.

Referring next to FIG. 6, a flowchart for a Hyper-Swarm Iterative Approximation Embodiment method is shown.

The Hyper-Swarm Iterative Approximation Embodiment method is structured as an iterative forecasting method wherein all participants engage in a two-round process, substantially synchronized (i.e. conducted in parallel) and each employing intelligent algorithms for optimization at each round.

The first round is referred to herein as the initial forecasting round and the second round is referred to as the secondary forcecasting round, the two rounds structured such that behavioral data is collected by comparing the changes to made by individual participants from round to round. It should also be noted that while it's described as two round process, additional rounds can be optionally implemented to capture further behavioral data and make further algorithmic optimization. The next of these additional rounds would be called a tertiary forcecsting round, etc.

This embodiment is structured as a two-dimensional forecasting method, meaning that a single forecast has two independent variables captured from participants. One variable is referred to herein as a primary forecast variable and represents a predicted outcome of an event in the future. The independent second variable indicates a confidence metric associated with the first forecast variable. This is referred to as a secondary forecast variable. It should be noted that in some embodiments, additional dimensions are enabled. An example of a third dimension is described further below.

As we are using a sports example for illustrative purposes herein, consider the primary forecast variable to be an indication of "WHO WILL WIN A FOOTBALL GAME AND BY HOW MANY POINTS?". Thus, each of the exemplary 1000 participants would be given an opportunity provide a forecast of this primary forecast variable at each forecasting round of the method. In addition, consider the secondary forecast variable to be an indication of "HOW MUCH WOULD YOU BET ON YOUR FORECAST OUTCOME?" as a numerical value of confidence between $0 and $100. These two variable as linked in that each user is asked to first make a prediction for the outcome of the football game, and then indicate a level of wager they would be willing to make on their forecast value. This comprises the two dimensions of forecasting.

It should be noted that this inventive system includes a scoring method such that participants are awarded points based their primary and secondary forecast variables, in consideration of the actual outcome of the predicted event. In one embodiment, points are awarded to participants based on both (a) how close to the actual outcome their Primary Forecast Variable was, and (b) how much they were willing to wager on their Primary Forecast Variable prediction. The closer to the actual outcome the participant was, and the more they were willing to wager, the more points they are awarded. In some embodiments, points are only awarded if the Primary Forecast Variable as exactly correct—for example, predicting the exact winner of the football game, and the exact number of points the winner would win by. In addition, if a participant's forecast is wrong (in some embodiments by being an incorrect value, or in other embodiments being off by more than a threshold amount, then instead of winning points the participants lose points—the magnitude of the loss being based at least in part upon the Secondary Forecast Variable (i.e. the amount they we were willing to wager). In some such embodiments the loss is binary, depending on whether the primary forecast value was correct or incorrect. In other embodiments the loss is also proportional to the degree to which the forecast value was off. In all cases, the scoring system is structure to incentivize participants to make their best possible forecast (both in primary and secondary values, and optionally additional values) at each round in the forecasting process.

It should be noted that scoring is based on each round of the iterative round process. Thus, the scoring process described above would assess points for the initial forecasting round as well as for the secondary forecasting round. of course, the points are not scored until later (i.e. until after the actual outcome of the event is known). In some embodiments the point value of each round is equal, for example participants having the ability to earn up to 100 points for the Initial Forecasting Round, and up to 100 points for the Secondary Forecasting Round. In other embodiments, the rounds are weighted, such that one round is worth more than another round. In a preferred embodiment, the primary round is worth 60% of the total points, and the secondary round is worth 40% of the total points. This weighting is used to incentive people to perform personal research and/or personal assessments during the initial round, generating the best initial forecasts possible. For embodiments that include additional rounds, the weighting of each round can be equal. That said, in preferred embodiments, the weighting of each round decreases with each iteration.

The current method can be divided into four stages. (1) Session Engagement, (2) Round One Forecasting, (3) Round Two Forecasting, and (4) Aggregated Forecast Processing.

The session engagement stage includes a computing device notification step 600. The present embodiment of the Hyper-Swarm system is structured such that during the computing device notification step 600 a central server sends out a push notification to a plurality of computing devices, each one of the computing devices associated with one of a plurality of participants, each of the notifications indicating that a new forecast is beginning and that they will have a defined period of time to complete their initial forecasts. In some embodiments the system is the collaboration system 200. In some embodiments the central server is the central collaboration server (CCS) 142. This notification can be pushed to personal computers, tablets, or phones, and is generally done through a traditional software application, a mobile app, or a web-app such that it pops up with a visual, audio, and/or tactile alert to get their attention.

For the sports example, a set of forecasts will be performed at the same time, the set including a number of individual forecasts. For example, the set might be all of the football games to be played on Sunday, which includes forecasts for each of the individual games. As the process described herein only requires a single forecast event, we will show it with respect to just one game, but it is understood that the same process is generally used for all games in the set (as independent predictions).

In a preferred embodiment, each computing device first receives an alert informing the associated user that a hyper-swarm session is starting and asking them to join the process. Each user can respond affirmatively or negatively by clicking a user interface (for example, a simple button response). If the user responds affirmatively, the central server will add the user to a data structure used for this prediction and the user will become a participant. In the preferred embodiment, the data structure will assign each participant a coordinate within a three-dimensional grid, as described above. The size of the grid will depend upon the number of participants that respond affirmatively, with an upper limit cap.

In this example we will assume that the upper limit was set to 1000 participants, and that the session was fully subscribed, meaning that affirmative responses came from 1000 participants in response to the push notifications. This means that the data structure will be defined by the central server as a 10×10×10 grid (such as that shown in FIG. 5). It also means that a first participant will be assigned the grid value (0,0,0) and a second participant will be assigned (0,0,1), and so on, until the full 10×10×10 grid is filled with participants. As described above, this further means that each of the 1000 participants has 26 neighbors in this grid structure, using the convention that opposing faces of the grid are adjacent (i.e. the 10th row in the 10×10 structure is adjacent to the 1st row). The reason for this structure and the definition of 26 neighbors will become apparent in the steps below. It should be noted that neighbors could be defined as a larger region, for example, the 5×5×5 grid around a participant, which would mean 124 neighbors for each person. It should noted that alternate data structures could be used, as described previously, to associate each participant with a sub-swarm. It should also be noted that the cubic structure used in this example could further employ a Small World Connectivity randomization process as described previously, such that random members of some sub-swarms could be replaced by members who are not among the 26 nearest neighbors.

Regardless of how the data structure is defined, once a set of participants has responding affirmatively and have been associated with the data structure, we can proceed to the initial forecasting round.

In the next conduct initial forecasting round step 602, Each participant in the hyper-swarm session is asked to make a set of initial forecasts, for example forecasts with respect to all the football games to be played on a given day. They will make these forecasts one by one. For example purposes we will only show the details of one such forecast, the prediction of the 49ers vs. the Raiders, but it is understood that many similar forecasts are generally made in a single session. During the initial forecasting round step 602, first at least one forecasting query is sent to each of the participant networked computing devices, each forecasting query describing a future event to be collaboratively predicted by the population of human participants. A representation of the forecasting query (or queries) is presented, at substantially the same time, to each member of the population on the computing device displays.

Figure 7:
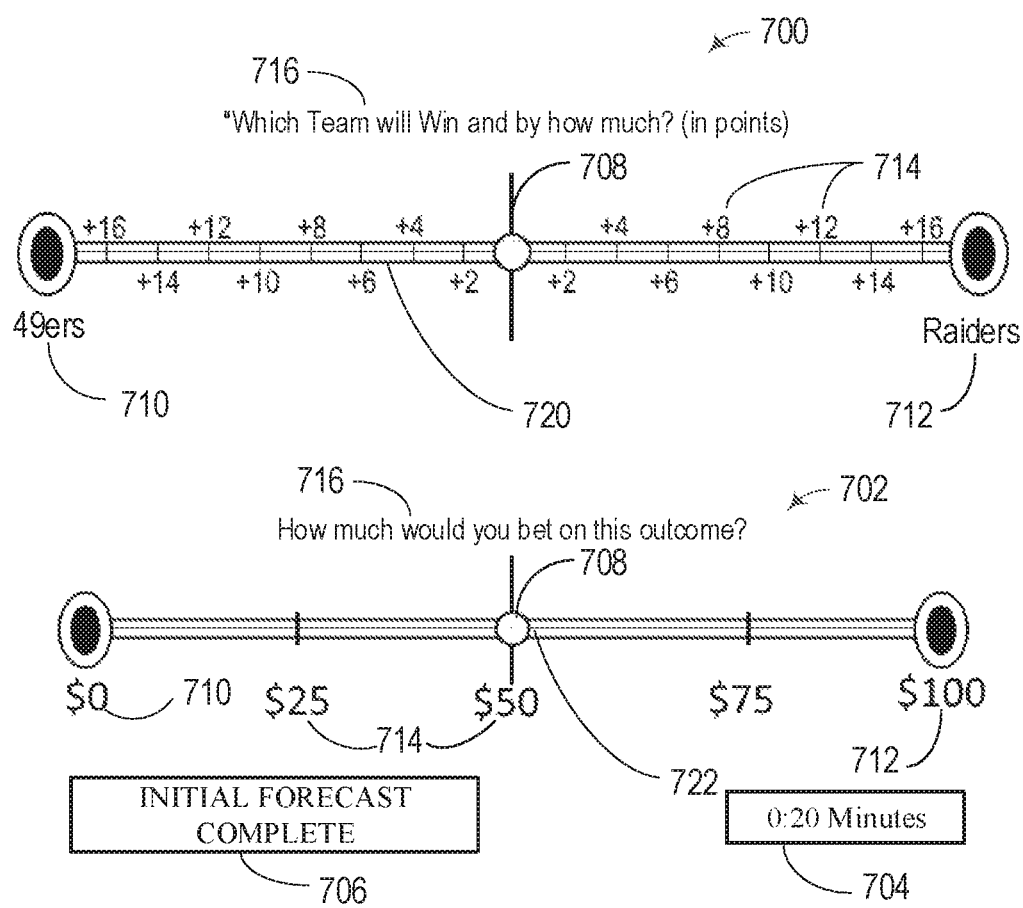
FIG. 7 is an exemplary display of a primary forecast variable user interface.

For each of said forecast query, an interface appears for each participant on their individual computing device (e.g. personal computer, tablet, phone). The interface can take many forms, but in a preferred embodiment, it is a set of selection lines, each with a moveable slider, one selection line/slider associated with the Primary Forecast Variable (a primary forecast variable user interface 700 as shown in FIG. 7) and one selection line/slider associated with Secondary forecast variable (a secondary forecast variable slider user interface 702). The primary forecast selection user interface 700 includes a primary variable selection line 720 and a primary variable slider 708 that is moved along the primary variable selection line 720 by the user to select a value. As shown in FIG. 7, the current selection for the primary variable is 0 (neutral). The secondary forecast selection user interface 702 includes a secondary variable selection line 722 and a secondary variable slider 718. As shown in FIG. 7, the current selection for the secondary variable is $50. In some embodiments, additional selection lines/sliders can be provided for addition related variable for a single forecast. That will be shown later.

In one example embodiment, two user interfaces 700 702 appear on the screens of all participants, at approximately the same time. In addition, a timer 704 appears indicating how much time the participants have for the full set of forecasts. For a session involving forecasting all 15 football games for a given weekend, the participants may be given a 20 minute timer, for example. This enables the participants to be coordinated in time, but also gives enough time for participants to research their answers. The system encourages research in the first forecasting round, as the more information participants gather (to win points) the smarter the overall hyper-swarm. In this way, the initial forecasting round is designed to encourage information gathering and assessment by the full population of participants.

An exemplary initial forecasting round interface is shown in FIG. 7. In this example the Primary forecast variable is the football team, and the secondary forecast variable is the bet size. Each selection line 720, 722 includes a first choice 710 at one end of the line 720, 722, a second choice 712 at the opposite end of the line 720, 722, and a plurality of selection values 714 along the line 720, 722. Each selection line 720, 722 is also associated with a prompt 716.

In addition to the user interfaces 700 and 702, a "FORECAST COMPLETE" button 706 is provided to participants, such that once they finish entering their forecast, they can register the data as final. Or they can wait for the timer to fully expire, at which point the data is also registered as final. Either way, the final values for each of the sliders above (Primary Forecast Variable user interface 700 and Secondary Forecast Variable user interface 702), i.e. an initial forecast response, is sent to the central server and is stored associated with the given user and that user's coordinate in the grid structure in a memory accessible by the central server (typically the Central Collaboration Server 142). Other variables may also be stored, such as demographic data about the users age, gender, location, experience level on the subject, and self-reported skill level on the subject in question. In some embodiments, each grid location is a block in a blockchain structure, enabling secure data storage.

After the initial forecasting round 602 is complete, the method proceeds to the optional perform population curation analysis step 604.

The central server now has initial forecasts from all 1000 participants in this session, for each of the forecast events (football games in this example) in question. Using this data, the system then performs a population curation analysis, determining which participants are most likely to be skilled forecasters and which participants are less likely to be skilled forecasters. This process is described in co-pending U.S. application Ser. No. 16/059,698 by the present inventor and is hereby incorporated by reference. The output of this process is a weighting factor associated with each participant, the weighting factor indicative how likely that participants forecast values are accurate, with the most likely accurate forecasters being weighted higher than the least likely. In some embodiments, after the population curation analysis an optional participant culling/weighting step 606 is used in addition to or instead of the weighting process such that the weakest predicted performers are removed from the process. In some such embodiments, if the objective is to have N participants in the hyper swarm, a set of N+M users are engaged in the initial forecasting round 602, such that M participants can be culled based on likelihood of low performance. For example, 1100 users (1000+100) could be engaged in the initial forecasting round 602, such that the lowest-performing 100 users (based on the curation prediction methods above) can be eliminated after the initial forecasting round 602, keeping only the top 1000 users. This enables optimization of forecasting after the initial forecasting round. In addition, the forecasts from the 1000 remaining users can be weighted based upon the likelihood that they are strong forecasters. This two-stage process is described in the aforementioned co-pending application.

The method then proceeds to the secondary forecasting round step 608. The central server has now collected data from all participants, optionally culled participants to a smaller set of likely strong performers, and optionally weighted remaining participants based on the predicted likelihood that they are strong performers. The next step is for participants to update their forecasts based on a presented stimulus. The stimulus is an indication to each participant of how other participants predicted the same events. This happens in parallel (all participants are informed at substantially the same time) so there is not a sequential biasing problem. In addition, all participants are provided with a unique but overlapping stimulus set, to ensure that a diverse range of responses is generated by the population (i.e. to ensure the population is not all responding to the same stimulus). This is where the sub-swarm definition comes in, as during the secondary forecasting round the central server identifies a swarm subset of participants for each participant, where each subset overlapping at least one other subset (i.e. each subset shares at least one participant with a different subset) as each participant in the defined data structure has a unique set of 26 neighbors. In the present embodiment, the population is arranged on nodes of a 3D grid, and the swarm subset is defined as the participant plus all participants on neighboring nodes (including on the diagonal), as shown in FIG. 4. In this embodiment, each participant is given information to review about how their 26 neighbors forecast the same event compared to their own forecast.

Figure 8:
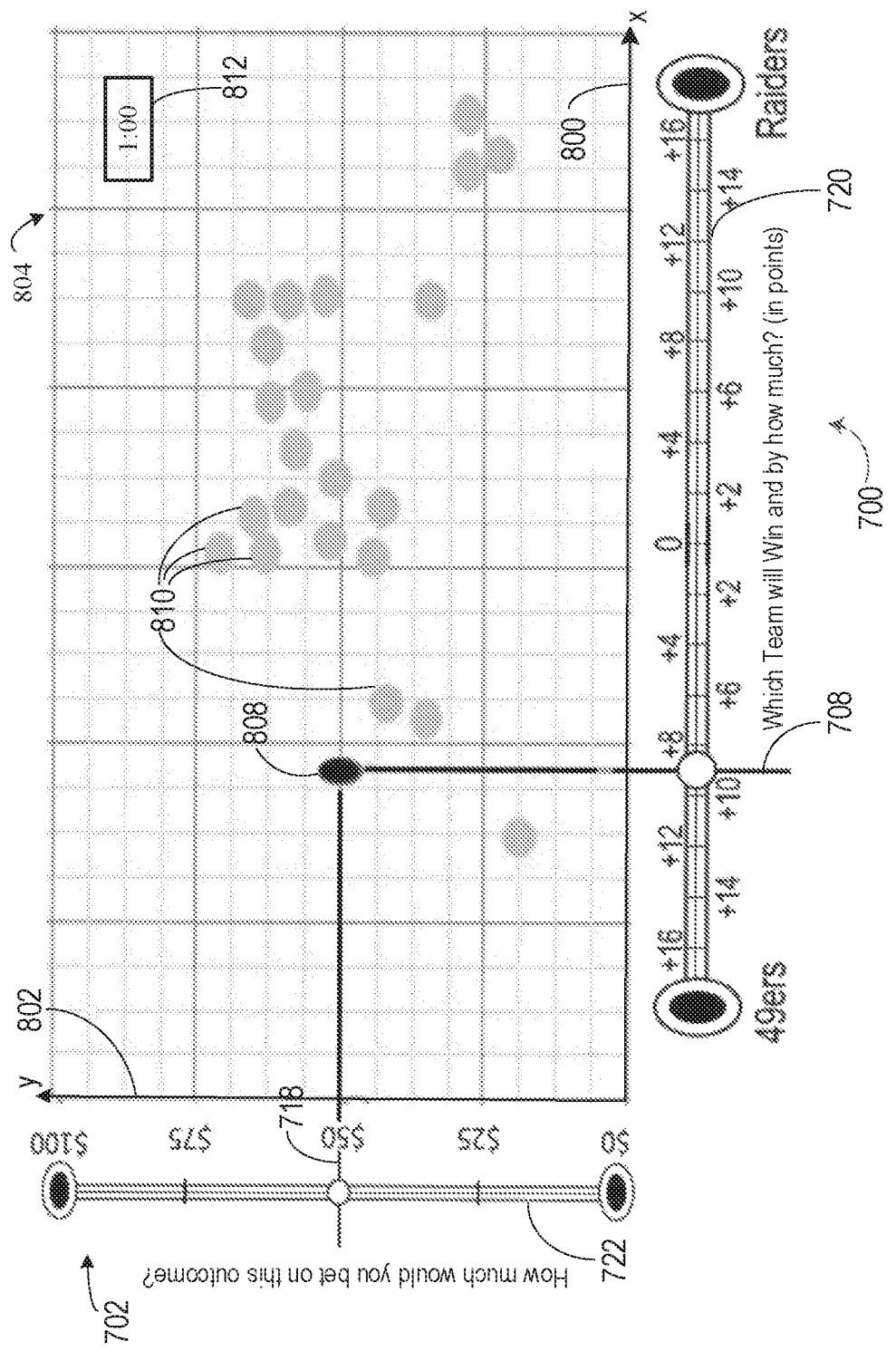
FIG. 8 is an exemplary stimulus display for a single participant in the population.

During the secondary forecasting round 608, at substantially the same time, a different overlapping subset of the initial forecast responses are displayed on each display. In the present embodiment, the initial forecast responses displayed are those of the participant plus the participant's 26 grid neighbors. An example stimulus display for a single participant in the population is shown in FIG. 8. As shown in FIG. 8, each participant is provided with an inventive display of information and data entry, enabling them to gain insight into the beliefs of a sub-set of fellow participants and update their own beliefs. Specifically, FIG. 8 shows two-dimensional coordinate grid 804 representing the two variables provided by participants, with the Primary Forecasting Variable represented on the X axis 800 and the Secondary Forecasting Variable represented on the Y axis 802. In this instance, the text "Which Team will Win and by how much? (in points)" associated with the primary variable is displayed on the X axis 800, and the text "How much would you Bet on it? (in dollars)" associated with the secondary variable is displayed on the Y axis 802.

The data plotted on the coordinate grid 804 are unique for each and every participant. First, what is plotted is that participant's own forecast data (Primary and Secondary forecasting variables) as shown by the participant data point 808. In this case we see that the location of the participant data point 808 on the coordinate grid 804 shows that the individual user in question predicted the 49ers would win by 9 points (on the X axis 800) and chose to bet $50 on that forecast (on the y axis 802).

Also plotted on this coordinate system are similar X-Y data points for all 26 of that participant's neighbors, as defined by that participant's positioning within the 10×10×10 data grid described previously. In this example figure, the neighbor forecast data points 810 (both in score and dollars bet) are shown for these 26 other participants.

Also provided is a countdown timer 812. This time provides a time limit on how long this particular participant has to consider the displayed beliefs of other participants, and optionally update his or her own forecast.

To update the forecast, the participant can use the displayed sliders 708, 718, moved along the corresponding selection line 720, 722, to adjust either or both variables. Alternatively, the user can drag the graphical datapoint 808 representing his or her on forecast.

Figure 9:
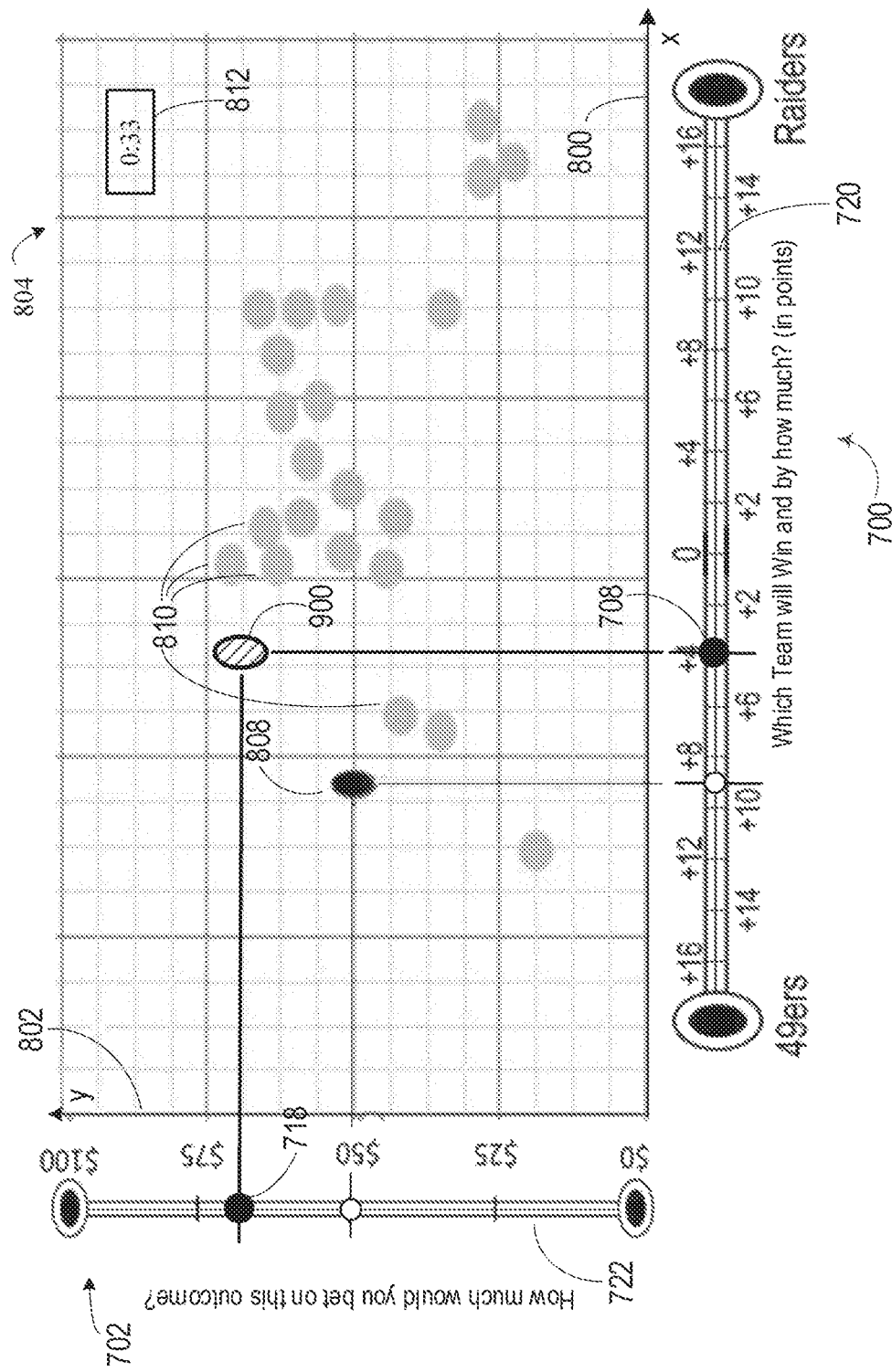
FIG. 9 is an updated version of the exemplary stimulus display of FIG. 8.

After the participant uses the user interfaces 700, 702 to update the forecast, the stimulus display is updated. An example of an updated stimulus display is shown in FIG. 9. An updated participant data point 900 showing the participant's updated forecast will indicate the participant's updated position, enabling the user to still see their old prediction still shown by the participant data point 808. This is helpful so they know their prior belief. This is also important because it reminds the participant that both their initial forecast and their final forecast are used in the scoring system. This is illustrated in FIG. 9, which shows that at 33 seconds left on the clock 812, this particular participant updated their forecast to 49ers win by 4, and increased their bet to $65 as shown by the coordinate location of the updated participant data point 900.

During the secondary forecasting round 608, updated forecast responses of the participants are sent to the central server and stored on a memory accessible by the central server (Central Collaboration Server 142).

Secondary forecasting round step 608 in the process is extremely powerful as it provides three critical elements. First, it enables all participants, in parallel, to re-evaluate their beliefs with the benefit of limited social influence (in this case, just 26 same data points out of a population of 1000). Second, it enables data to be collected representing this informative behavioral response from all participants, as the direction and magnitude of the change is indicative of confidence (as will be described below). Third, by virtue of every participant being exposed to a unique sub-swarm of beliefs, a diverse range of behaviors are induced rather than the typically flawed serial market process where every participant is being influenced by the exact same time history of individual data transactions. Thus the shift to parallel assessments (instead of serial) and the shift to distributed and unique sub-swarms (instead of identical time histories) enable us to evoke a significantly more insightful and accurate aggregation of knowledge, wisdom, opinions and intuitions than other methods.

Figure 10:
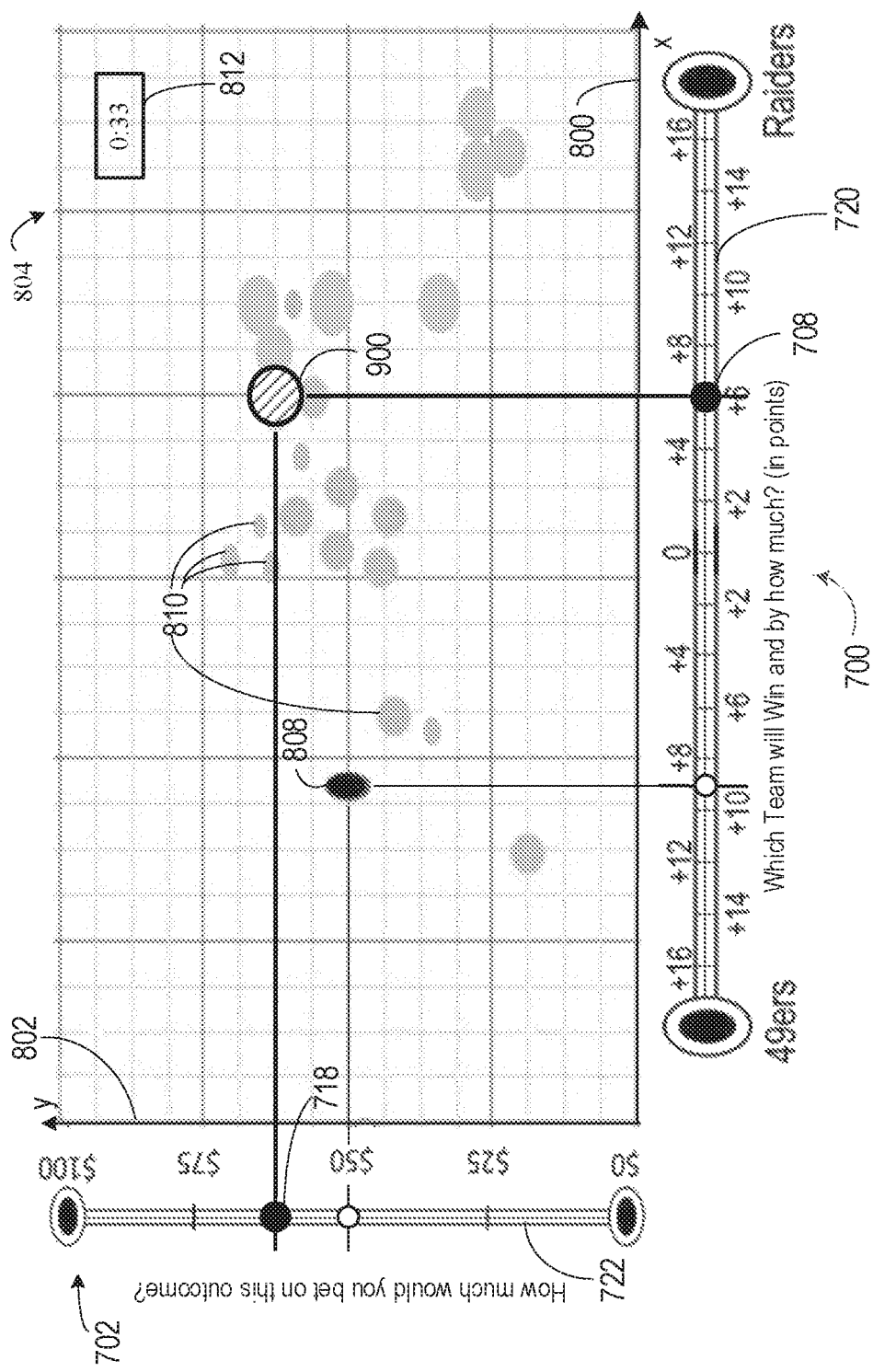
FIG. 10 is a version of the exemplary stimulus display of FIG. 8 including weighting factors.

Optionally an additional facet of data display is implemented, as shown in an exemplary display of FIG. 10. Specifically, for each user in the population curation analysis step 604, the weighting factor is generated based on their full set of initial responses and the machine-learned algorithm for predicting the likelihood that each participant is a skilled forecaster. This weighting factor is then applied to the neighbor forecast data points 810. This information is useful and can be displayed by varying the size and/or color of the displayed data points shown. Other information can also be used in determining the graphical weighting of the data points (for example historical accuracy of participants).

An example of displayed weighting factors by participant is shown in FIG. 10. As seen, by modifying the size of the neighbor forecast data points 810 by indicating the weighting factors associated with individual participants as larger data point size for higher weighting factor (indicating higher predicted likelihood that the given user is accurate), the participant who is viewing this particular screen (of his or her 26 neighbors) is given a more informative set of data to consider. And with this additional information, the example user makes a different behavioral change to his or her initial prediction. This display option of varying the dot size (or color, for example, instead) for the neighbor forecast data points 810 is useful for situations where a wide range of weighting factors are generated.

Figure 11:
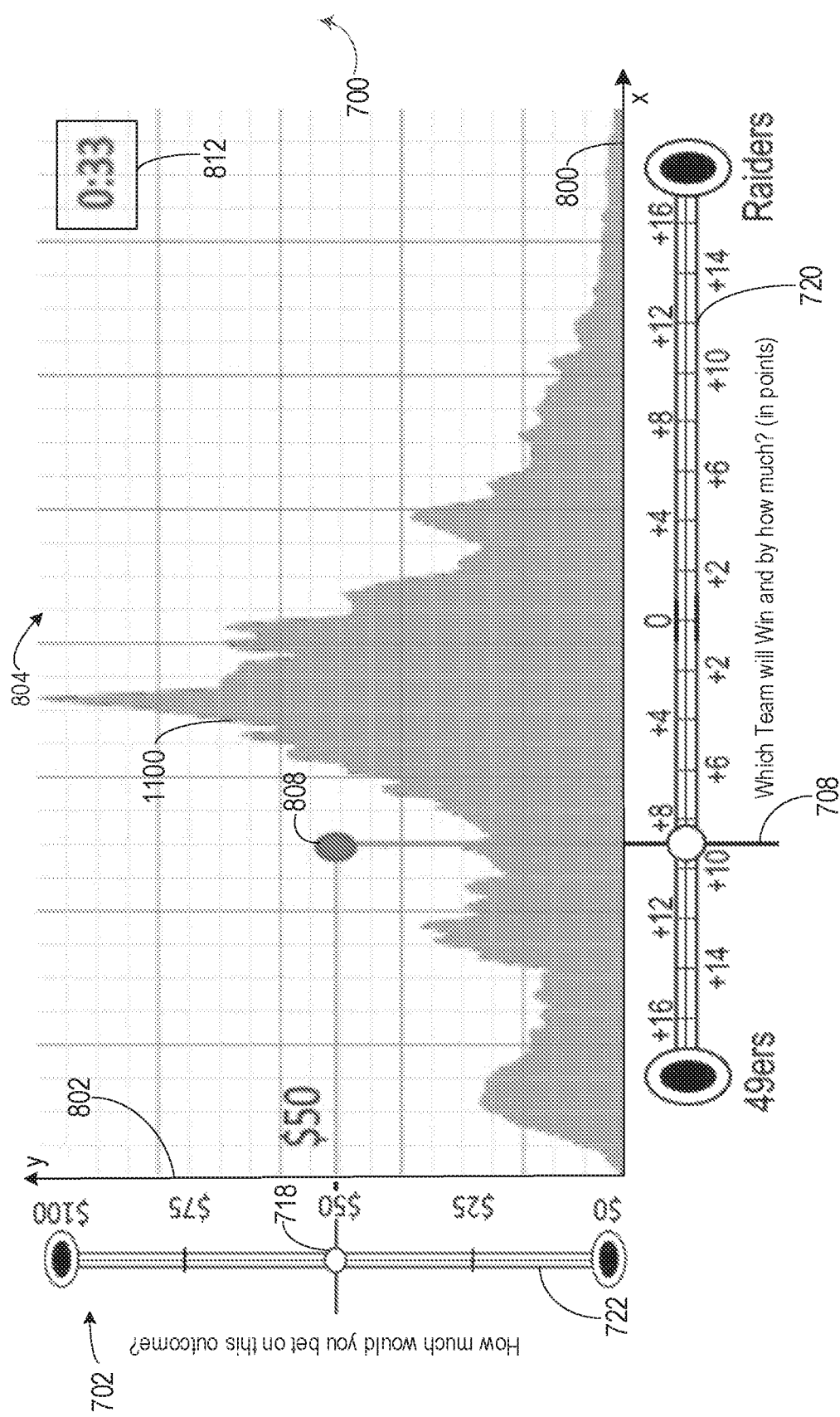
FIG. 11 is an exemplary stimulus display including a histogram.

In some embodiments, a participant has the option of choosing an alternate data display rather than the data points (i.e. dots) displayed on the graph above. In one such embodiment, the users can display a histogram that represents the beliefs of their sub-swarm. This is most useful for embodiments of much larger populations, for example 1 million users, represented in a 100×100×100 grid, and provided data about 7×7×7 neighbors (343 neighbors). For such an example, the dots would be overwhelming, but a histogram is informative as shown in FIG. 11. As shown in FIG. 11, the histogram 1100 shows the dollars bet (y-axis 802) per point spread (x-axis 800). This can be a true histogram, or in preferred embodiments us a weighted histogram using the population curation weighting values described above.

The method then proceeds to the secondary round analysis step 610. After the initial forecasting round 602 and the secondary forecasting round 608, the central server now has both initial forecasts and updated forecasts from all 1000 participants in this session, for each of the forecast events (i.e. each of the football games). Using this data, the central server can now perform a second level of optimization wherein the behaviors of users, performed in response to the unique sub-swarm data displayed to them, is used to compute Round Two weighting factors indicative of an inferred confidence level of participants. This can be done using a heuristic algorithm or a machine learned algorithm. With respect to an example heuristic, the present invention can assign confidence weightings to final predictions based on the following: a person who makes a significant change of their Primary Prediction Variable to conform to a majority within their local sub-swarm is likely less confident than someone who largely resists conforming. Also, a person who increases their wager as a result of conforming to a majority of the sub-swarm is less likely to have strong conviction than a person who increases their wager by conforming to a minority within the sub-swarm. In addition, machine learning has been used to optimize the algorithm that turns behavior into confidence levels. This is described in the section labeled Machine Learning below.

In the next optional update input step 612, users optionally update input and user input data collected and stored during the secondary forecasting round.

Next, in the final predication step 614, the central server now computes a final optimized aggregated prediction (also referred to as a final collaborative forecast). This aggregation is based on the full set of initial predictions, the full set of final predictions, the initial Round One weighting factors, and the Round Two weighting factors generated from the behavioral data based on how people change. The final collaborative forecast provides an answer to the forecasting query (or queries).

Optional additional round(s) step 616 may be included in the method. The central server can repeat the process of steps 610 and 614 by displaying the updated forecasts of sub-swarms to participants (that came out of steps 602 and 604) and enabling participants to update their forecasts again. This enables further refinement of participant beliefs, and enable further capturing and assessment of behavioral data.

Figure 12:
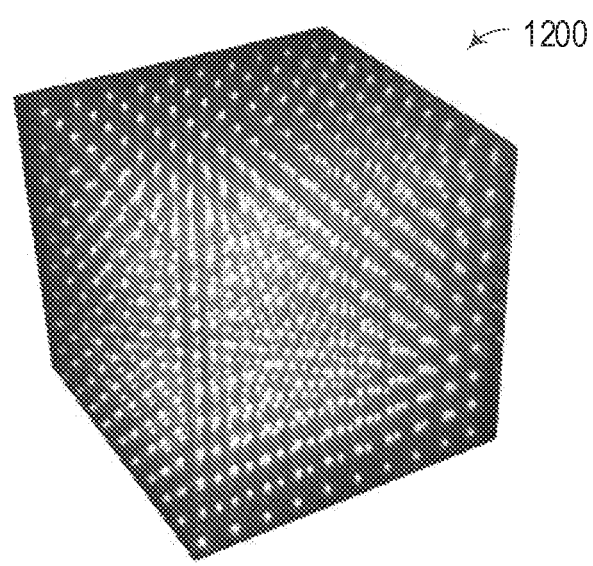
FIG. 12 is an exemplary volumetric visualization of hyper-swarm characteristics.

Referring next to FIG. 12, an exemplary volumetric visualization of hyper-swarm characteristics 1200 is shown.

Referring again to FIGS. 1-12, because every participant is represented in a 3D grid structure wherein every participant evaluates the beliefs of their 26 neighbors and updates their own beliefs (in parallel), the full behavior of the 1000-member population can be visualized and/or analyzed as a complete system. In certain local regions, random noise may distort results, while on most regions, consistent results generally emerge. Volumetric visualization techniques can be used to display (a) the range of final predictions, (b) the range of confidence values, (c) the range of variability within sub-swarms, (d) the range of change between initial and final predictions within sub-swarms. An example volumetric visualization of hyper-swarm characteristics 1200 is shown in FIG. 12.

Typical polling systems for forecasting ask each individual to provide an isolated forecast on a survey and computes a statistical aggregation. The problem is, every participant in that population has (a) a different level of confidence and/or conviction in their answer, (b) they are very poor at expressing or even knowing their true confidence on a survey, and (c) if asked to report their confidence, every individual has a very different internal scale—so reported confidence can't be averaged across participants with accuracy. For prediction markets, rather than polls, there is generally a more authentic expression of confidence as people are putting money on the line, but because every transaction happens in series, each person is influenced by the person who comes before them, who were in term influenced by the person who came before them. This creates a "snowballing" effect that has been shown to significant distort results. Thus, traditional methods fail, as they either (a) provide no interaction by which participants can converge on common confidence scales, or (b) enable interaction in series, which causes snowballing effects that amplify noise and reduce accuracy.

To solve this problem, the unique parallelized behavioral data is collected in the steps of FIG. 6 above, enabling participants to evaluate the beliefs of others (forecast and confidence) without snowballing effect. This, combined with unique machine learning techniques, has enabled us to weight the contributions of each participant in the population based on a more accurate indication of their relative confidence in their personal predictions, and/or the relative accuracy of those predictions.

For example, one basic embodiment of this process for estimating confidences using machine learning as follows: the system collects behavioral data that includes the (a) the magnitude of the change in the primary forecast variable (e.g. who will win and by how much) between that participants initial forecast and final forecast, (b) whether then change in primary forecast variable corresponds with closing the gap (i.e. compliance magnitude) between that participant and the majority or largest plurality or statistical mean of the neighbor data points that influenced that user or if it reflected resistance to conforming with the neighbor data points (i.e. defiance magnitude). (c) the time taken to adjust the sliders when considering the neighbor data points, (d) the magnitude of the change in the secondary forecast variable that reflects confidence (e.g. how much would you bet) between that participants initial forecast and final forecast (i.e. did they get more confident or less confident as a result of viewing the neighbor datapoints), (e) combined effects—did the user defy the neighbors but reduce confidence, or defy neighbors and increase confidence, or comply with neighbors and increase confidence, or comply with neighbors and reduce confidence, and by how much, (f) and how did these behaviors vary across the full set of forecasts (e.g. the set of all football games predicted for a given Sunday)—as it is telling if a participant is defiant on some forecasts, and compliant on others—and so, the defiance vs compliance values are normalized across the full set to assess their relative confidence across games.

Using this data, the machine learning system is trained on the true outcome of the primary forecast variable, with scoring scaled for each user by their secondary forecast variable (e.g. confidence). Using Football as an example, if the true outcome of the game is Team A+4, and the user's initial guess is Team A+9, they might get an initial accuracy score of: $|(4-9)|=5$, where the lower the score, the better, with a perfect score being 0. If their updated score was +8, they will get an updated score of: $|(4-8)|=4$, where the lower the score, the better, with a perfect score being 0. The updated score is also normalized with consideration as to whether the neighbors influenced towards the correct score, or away from the correct score. These scores act as a measure of the user's skill in prediction overall, and by training a Machine Learning algorithm on these scores, the system can predict which users are more likely to be most skillful at predicting the game in question. With this predicted skill level, the software of the system is then able to weight new users' contributions to the hyper-swarm.

In some embodiments of the present invention, a plurality of values are generated for each participant that reflect that participant's overall character across the set of events being predicted (e.g. a full set of football games). By looking across the set of predictions, additional characteristics can be generated. As described in co-pending patent applications incorporated by reference, outlier index is one such multi-event value that characterizes each participant with respect to the other participants within the population across a set of events being predicted. In addition, a confidence index is generated in some embodiments of the present invention as a normalized aggregation of the confidence values provided in conjunction with each prediction within the set of predictions. For example, in the sample set of questions provided above, each prediction includes Confidence Question on a scale of 0% to 100%. For each user, the confidence index is the average confidence the user reports across the full set of predictions, divided by the average confidence across all users across all predictions in the set. This makes the confidence index a normalized confidence value that can be compared across users. In addition, multi-event self-assessment values are also collected at the end of a session, after a participant has provided a full set of predictions In some embodiments of the present invention, a plurality of multi-event characterization values are computed during the data collection and analysis process including (1) Outlier Index, (2) Confidence Index, (3) Predicted Self Accuracy, (4) Predicted Group Accuracy, (5) Self-Assessment of Knowledge, (6) Group-Estimation of Knowledge, (7) Behavioral Accuracy Prediction, and (8) Behavioral Confidence Prediction. In such embodiments, additional methods are added to the curation step wherein Machine Learning is used to find a correlation between the multi-event characterization values and the performance of participants when predicting events similar to the set of events.

In such embodiments, a training phase is employed using machine learning techniques such as regression analysis and/or classification analysis employing one or more learning algorithms. The training phrase is employed by first engaging a large group of participants (for example 500 to 1000 participants) who are employed to make predictions across a large set of events (for example, 20 to 40 baseball games). For each of these 500 to 1000 participants, and across the set of 20 to 40 events to be predicted, a set of values are computed including an Outlier Index (OI) and at least one or more of a Confidence Index (CI), a Predicted Self Accuracy (PSA), a Predicted Group Accuracy (PGA), a Self-Assessment of Knowledge (SAK), a Group Estimation of Knowledge (GAK), a Behavioral Accuracy Prediction (BAP), and a Behavioral Confidence Prediction (BCP).

In addition, user performance data is collected after the predicted events have transpired (for example, after the 20 to 40 baseball games have been played). This data is then used to generate a score for each of the large pool of participants, the score being an indication of how many (or what percent) of the predicted events were forecast correctly by each user. This value is preferably computed as a normalized value with respect to the mean score and standard deviation of scores earned across the large pool of participants. This normalized value is referred to as a Normalized Event Prediction Score (NEPS). It should be noted that in some embodiments, instead of discrete event predictions, user predictions can be collected as probability percentages provided by the user to reflect the likelihood of each team winning the game, for example in a Dodgers vs Padres game, the user could be required to assign percentages such as 78% likelihood the Dodgers win, 22% likelihood the Padres win. In such embodiments, alternate scoring methods may be employed by the software system disclosed here. For example, computing a Brier Score for each user or other similar cost function.

The next step is the Training Phase wherein the machine learning system is trained (for example, using a regression analysis algorithm or a neural network system) to find a correlation between a plurality of the collected characterization values for a given user (i.e. a plurality of the Outlier Index, the Confidence Index, a Predicted Self Accuracy, a Predicted Group Accuracy, a Self-Assessment of Knowledge, a Group Estimation of Knowledge, a Behavioral Accuracy Prediction, and a Behavioral Confidence Prediction) and the Normalized Event Prediction Score for a given user. This correlation, once derived, is used by the inventive methods on characterization value data collected from new users (new populations of users) to predict if the users are likely to be a strong performer (i.e. have high normalized Event Prediction Scores). In such embodiments, the machine learning system (for example using multi-variant regression analysis) will provide a certainty metric as to whether or not a user with a particular combination of characterization values (including an Outlier Index) is likely to be a strong or weak performer when making event predictions. In other embodiments, the machine learning system will select a group of participants from the input pool of participants that are predicted to perform well in unison.

Thus, the final step in the Optimization and Machine Learning process is to use the correlation that comes out of the Training Phase of the machine learning system. Specifically, the trained model is used by providing as input a set of characterization values for each member of a new population of users, and generating as output a statistical profile for each member of the new population of users that predicts the likelihood that each user will be a strong performer based only on their characterization values (not their historical performance). In some embodiments the output is rather a grouping of agents that is predicted to perform optimally. This is a significant value because it enables a new population of participants to be curated into a high performing sub-population even if historical data does not exist for those new participants.

Figure 13:
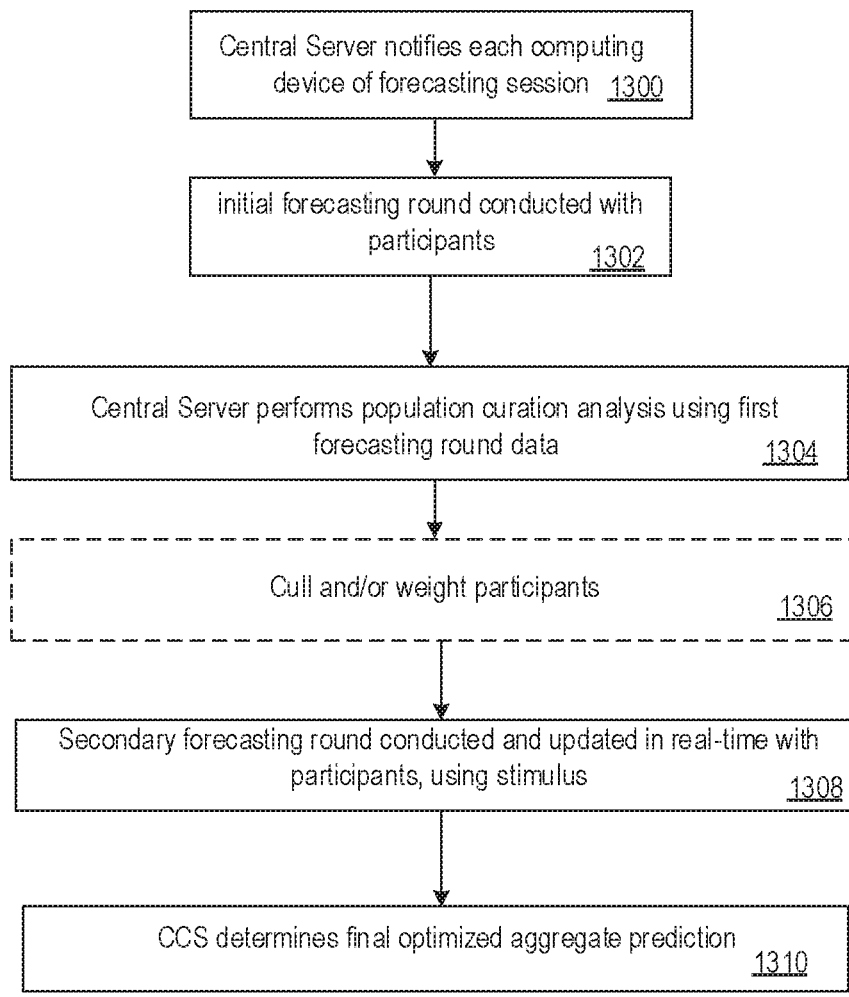
FIG. 13 is a flowchart for a real-time swarming embodiment method.

Referring next to FIG. 13, a flowchart for a real-time swarming embodiment method is shown.

The real-time swarming method is structured as a real-time forecasting method wherein all participants engage in a synchronous process within their sub-swarms, with real-time data transfer within the limits of human perceptual abilities. The steps are similar to the methods shown above in FIG. 6, but is structured to enable continuous change rather than discrete rounds. This has profound advantages because it allows the full population to function as a unified system, with data propagating through the population as a result of every participant being a member of an overlapping sub-swarm. In this way, all users are exposed to a totally unique set of other users (and their respective beliefs) greatly reducing the possibility that random noise gets amplified (as happens in serial markets), while enabling the full system to still converge on optimized results. The the propagation of sentiments within a large-scale population as it converges on a global sentiment can be visualized in real time using the volumetric approach shown above with respect to FIG. 12.

The process starts with an engagement process (Stage 1, step 1300) wherein participants are coordinated for a session that requires synchronous activity. This is followed by an initial prediction stage (Stage 2, steps 1302 and 1304) wherein participants provide their baseline forecasts (i.e. the starting points for their participation). This initial prediction period allows for research into the questions, promoting information gathering. This is then followed by a real-time interactive updating (Stage 3, step 1308). A fixed time limit is placed upon this process, for example 60 to 90 seconds wherein participants update their individual beliefs in real-time, based on exposure to the beliefs of their neighbors. But unlike the prior embodiment, this is continually updated in real-time, thus participants see the dots representation the views of their neighbors change in real time (move in real time) as everyone is updating their forecast synchronously. But because every user only has a view into their individualized sub-swarm, unique beliefs can emerge in different places within the hyper-swarm structure. And because all sub-swarms overlap, beliefs will propagate across the structure, ideally until a global consensus (global maxima) is reached.

In the first computing device notification step 1300, as with the prior embodiment shown in FIG. 6, this present can be configured such that a central server initiates a synchronous session by sending out a push notification to a plurality of computing devices, each of the computing devices associated with one of a plurality of participants, each of the notifications indicating that a new forecast is beginning. This notification can be pushed to personal computers, tablets, or phones, and is generally done through a traditional software application, a mobile app, or a web-app such that it pops up with a visual, audio, and/or tactile alert to get their attention.

In a preferred embodiment, each computing device receives an alert informing them that a hyper-swarm session is starting and asking them to join the process. They can respond affirmatively or negatively by clicking a user interface (for example, a simple button response). If they respond affirmatively, the central server will add them to a data structure used for this prediction. In the preferred embodiment, the data structure will assign each participant a coordinate within a 3D grid or an alternative data structure, as described above.

In the next initial forecasting round step 1302, similar to step 602, each participant in the hyper-swarm session is asked to make a set of initial individual forecasts, for example forecasts with respect to all of the football games to be played on a given day. In one example embodiment, two sliders appear on the screens of all participants for each game forecast, as well as a global TIMER for the full set of forecasts. For a session involving forecasting all 15 football games for a given weekend, the participants may be given a 20 minute timer, for example. This enables the participants to be coordinated in time, but also gives enough time for participants to research their answers. The system encourages research, as the more information participants gather, the smarter the overall hyper-swarm. The exemplary display of FIG. 7 is also applicable to the current method.

In addition to the above sliders, the "INITIAL FORECAST COMPLETE" button 706 is provided to participants, such that once they finish entering their forecast, they can register the data as final. Or they can wait for the timer to fully expire, at which point the data is also registered as final. Either way, the final values for each of the user interfaces 700, 702 above (Primary Forecast Variable user interface 700 and Secondary Forecast Variable user interface 702) is sent to the central server and is stored associated with the given user and that user's coordinate in the grid structure. Other variables may also be stored, such as demographic data about the users age, gender, location, experience level on the subject, and self-reported skill level on the subject in question. In some embodiments, each grid location is a block in a blockchain structure, enabling secure data storage.

After the initial forecasting round 1302 is complete, the method proceeds to the perform population curation analysis step 1304. The central server now has initial forecasts from all participants in this session. In the optional culling/weighting step 1306, using this data, the system performs a population curation analysis, determining which participants are most likely to be skilled forecasters and which participants are less likely to be skilled forecasters. This process is described in co-pending U.S. application Ser. No. 16/059,698 by the present inventor, hereby incorporated by reference. The output of this process is a weighting factor associated with each participant, the weighting factor indicative how likely that participants forecast values are accurate, with the most likely accurate forecasters being weighted higher than the least likely. In some embodiments, a culling process is performed in step 1306 and used in addition to or instead of the weighting process such that the weakest predicted performers are removed from the process. The culling and weighting processes of step 1306 are similar to those of step 606 previously described in FIG. 6.

The method then proceeds to the next secondary forecasting round updated in real-time step 1308. The central server has now collected data from all participants, optionally culled participants to a smaller set of likely strong performers (in step 1306), and optionally weighted remaining participants based on the predicted likelihood that they are strong performers (in step 1306). The current step 1308 is for participants to update their forecasts based on a stimulus. The stimulus is an indication to each participant of how other participants predicted the same events. This happens in parallel (all participants are informed at substantially the same time) so there is not a sequential biasing problem. In addition, all participants are provided with a unique but overlapping stimulus set, to ensure that a diverse range of responses is generated by the population (i.e. to ensure the population is not all responding to the same stimulus). This is where the sub-swarm definition comes in, as each participant in the defined data structure has a unique set of 26 neighbors. In this method, each participant is given information to review about how their 26 neighbors forecast the same event compared to their own forecast. An example display is shown above in FIG. 8.

As shown in FIG. 8 above, similarly to the method of FIG. 6, each participant is provided with the inventive display of information and data entry, enabling them to gain insight into the beliefs of a sub-set of fellow participants and update their own beliefs. Specifically, FIG. 8 shows the two-dimensional coordinate grid 804 representing the two variables provided by participants, with the Primary Forecasting Variable on the X axis 800 and the Secondary Forecasting Variable on the Y axis 802. What is different about this method from the method of FIG. 6, is that as each participant updates their sliders (in real time) their updated data is sent by the central server to all their neighbors in real time. Thus, for the participant who sees the image above in FIG. 8, all of the neighbor forecast data points 810 representing other users are moving in real time as those users are updating their beliefs based on their unique set of neighbors. This puts the entire hyper-swarm structure into motion in real-time, with feedback loops connecting all users through overlapping sub-swarms. This will cause beliefs to propagate throughout the structure, battling for dominance until a local maxima emerges. Or, until it is determined that no unified belief will emerge.

The displayed countdown timer 812 (starting at 60 seconds in this example) provides a time limit on how long this interactive process will continue. For a small swarm, 60 seconds may be enough, but for a very large-scale swarm, a longer period may be required.

In some interactive embodiments, a participant has the option of choosing an alternate data display. In one such embodiment, the users can display a real-time histogram that represents the continually changing beliefs of their sub-swarm. This is most useful for embodiments of much larger populations, for example 1 million users, represented in a 100×100×100 grid, and provided data about 7×7×7 neighbors (343 neighbors). For such an example, the dots would be overwhelming, but a histogram is informative as shown above in FIG. 11.

At the end of the interactive period, the central server has both initial forecasts and updated forecasts (captured as a sequence of time varying values from all participants in this session) for each of the forecast events (i.e. each of the football games). Using this data, In the final step 1310, the central server can now perform a final optimization wherein the behaviors of users, performed in response to the unique sub-swarm data displayed to them, is used to compute final weighting factors indicative of an inferred confidence level of participants. This can be done using a heuristic algorithm or a machine learned algorithm as described previously.

Machine learning can follow the same basic model described above for the two-round system of FIG. 6 (using the initial and final forecasts for each participant in the same manner). Machine learning can also be more sophisticated, as the full population is interacting at the same time, providing deeper behavioral data over time. In these embodiments, time-based characteristics are captured, assessed, and used for machine learning, reflecting not just the magnitude of the changes in primary and secondary forecast values, but the speed of change, delay until change, and timing of the change, across the convergence time period. In addition, the behavior of each participants forecast changes can be assessed in comparison the changes (in real time) of the neighbor forecasts they are exposed to.

Figure 14:
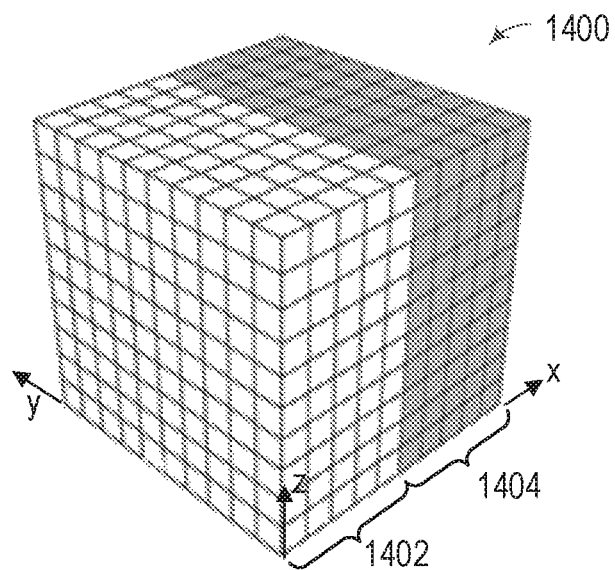
FIG. 14 is an illustration of an exemplary grid-arranged population with participants grouped in regions.

Referring next to FIG. 14, an exemplary grid-arranged population 1400 is shown. Thus far we have considered hyper-swarms comprised of randomly selected populations that are uniform in distribution, with curation related to determined skill level in predictions. For hyper-swarms that generate insights related to decisions or predictions, it is sometimes informative to curate populations by demographic characteristics. In some such embodiments, populations can be curated with information regarding the age, gender, location, political affiliation, interests, and expertise of participants. In some such embodiments, the placement of individuals within the xyz grid structure can be controlled such that relatively even distributions of demographic characteristics fall within each sub-swarm region of the grid. While it may be impossible generate perfectly even distributions, the large number of sub-swarms will allow the minor fluctuations in a given demographic characteristic to cancel out. In other embodiments, it may be desirable to assign people of particular bias, expertise, or characteristic to certain regions of the xyz structure, enabling observation of how predictions, decisions, or opinions propagate through the structure.

For example, a political hyper-swarm could be structured with even distributions of democrats and republicans across sub-swarms. Or, could be structured with segregated sub-swarms, with boundaries side by side, enabling very informative propagations of sentiment throughout the structure. An example of such a structured arrangement is shown in FIG. 14. The grid-arranged population 1400, arranged on the xyz coordinate system, includes a Republican region 1402 and a Democrat region 1404.

In some embodiments, arrangement of the hyper-swarm structure can be even more complex, with different regions for example, for different age-groups and/or genders and/or professions and/or political affiliation and/or level of education. For sports predictions, regions can be defined, for example, based on favorite sports, favorite teams, and/or experience level in predicting the sport in question. The value of such a prescribed structure is that optimized solutions will propagate throughout the hyper-swarm in informative ways, indicating if a particular sentiment can emerge even when populations are segregated by critical characteristics.

While it would be totally impractical to have 1000 people participate in a "chat room" to debate the issues, having real-time participants broken into sub-swarms can be supplemented with localized chat rooms for discussion and debate of the issues being forecast and/or decided. What is revolutionary about this architecture is that each sub-swarm is a unique distribution of people, all overlapping. This means a group of 1000 people can have a conversation where ideas propagate throughout the full population, but no single individual will interact with more than their 26 neighbors (a totally manageable number for real-time communication). Text chat can be structured as group chat, or can be structured so that each participant has the ability to private message any one of their neighbors, to ask for details as to why their opinion is the way it is on the chart.

This cannot easily be extended to voice chat among sub-swarms, with overlapping distributions of people—because in voice, timing matters and you can have multiple people talking at the same time, because they are not in the same sub-swarm as each other, but are in your sub-swarm. This can be inventively handled with (a) voice buffering to avoid overlap in time or (b) moderated turn-taking, but create complex logistics. Text chat solves this, as timing is not as consequential.

In some embodiments of the present invention, alternate data structures can be used for representing the relationships between participants. In the embodiments above, the participants are structured in an xyz grid, with sets of neighbors called sub-swarms which overlap, enabling propagation of influence across the full structure. To drive deeper propagation, the structure can also include "hyper-neighbors" which are participants treated as being part of a given user's sub-swarm but who are not local in the xyz grid. A "hyper-neighbor" could be someone who is a random distance away within the grid. This enables propagation of signals through jumps across the system. In many ways, this is how networks of neurons in neurological brains are structured, as most influence is local neighbors, but some neurons bridge between regions.

Figure 15:
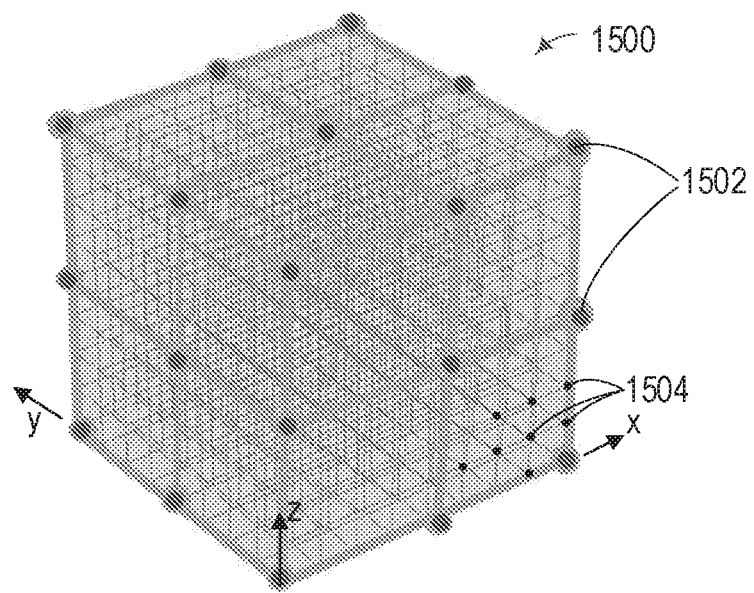
FIG. 15 is an illustration of an exemplary supervisory subswarm grid-arranged embodiment.

One way to link regions is to have participants at critical node points within the structure, participate in a unique sub-swarm (referred to herein as a supervisory-subswarm) that only includes other node points. These participants are therefore acting as a higher order aggregator within the system, as they are seen as neighbors to their local region within the structure, but they see as neighbors participants who are at other node points. FIG. 15 shows an exemplary supervisory subswarm grid-arranged embodiment 1500 including node participants 1502, spaced evenly across the larger xyz structure (hidden node participants 1502 at the center and back faces are not shown for clarity). Conventional participants 1504 located at other grid intersections as previously described.

In the embodiment above, the members of the supervisory subswarm can be provided with two data displays at once for use in making their updated predictions. One data display shows them their local neighbors within the xyz grid, and one data display that shows them the hyper-neighbors at the distant node points, thus giving them a view into the views of the system as a whole. For a real-time system that is converging in parallel, these supervisory members enable rapid propagation of information. In some embodiments, supervisory members are identified to all members within their local display, so they can see the views of the supervisory member in their evaluation, for example by having their data dot a unique color or size.

In some embodiments, members of supervisory subswarms are weighted higher in the final aggregation process, as they have considered a more global view of the full population, as the full population has converged.

Figure 16:
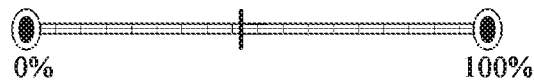
FIG. 16 is an exemplary slider set user interface display for a multi-option question.
Figure 16:
Figure 16:
Figure 16:
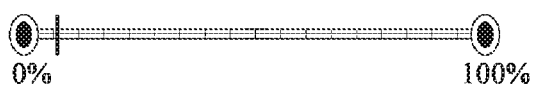
Figure 16:

Referring next to FIG. 16, an exemplary slider set user interface for a multi-option question is shown in one embodiment of the present invention.

The above examples have been presented using a user interface presenting at least one forecast variable that is a linear scale between two outcomes (e.g. outcomes of Team A wins and Team B wins). The present invention can support a wide range of other question types. For example, a multi-option question such as: "Who will win: A, B, C, D, or E?". An example of this type of question could be "Who will win Best Actor in the Oscars: Actor A, Actor B, Actor C, Actor D, or Actor E?" To support this type of question, a set of slider-based user interfaces can be provided, asking participants to give a probability for each answer option, each slider user interface linked so that they must add to 100%. An exemplary display for this multi-option question is shown in FIG. 16. Five user interfaces are shown: an option A interface 1602, an option B user interface 1604, an option C user interface 1606, an option D user interface 1608, and an option E user interface 1610.

In the example shown in FIG. 16, the Primary Forecast Variable for each participant has 5 values (P1, P2, P3, P4 and P5). The participant moves the slider associated with each user interface 1602, 1604, 1606, 1608, 1610 to select a percentage value for each option. The slider values are linked such that P1+P2+P3+P4+P5=100%. In addition to the user interfaces for the primary forecast variable, a set of Secondary Sliders can be provided (not shown) that enable the participant to indicate confidence in each of these forecasts, either individually, or holistically (for the whole set), or both.

Figure 17:
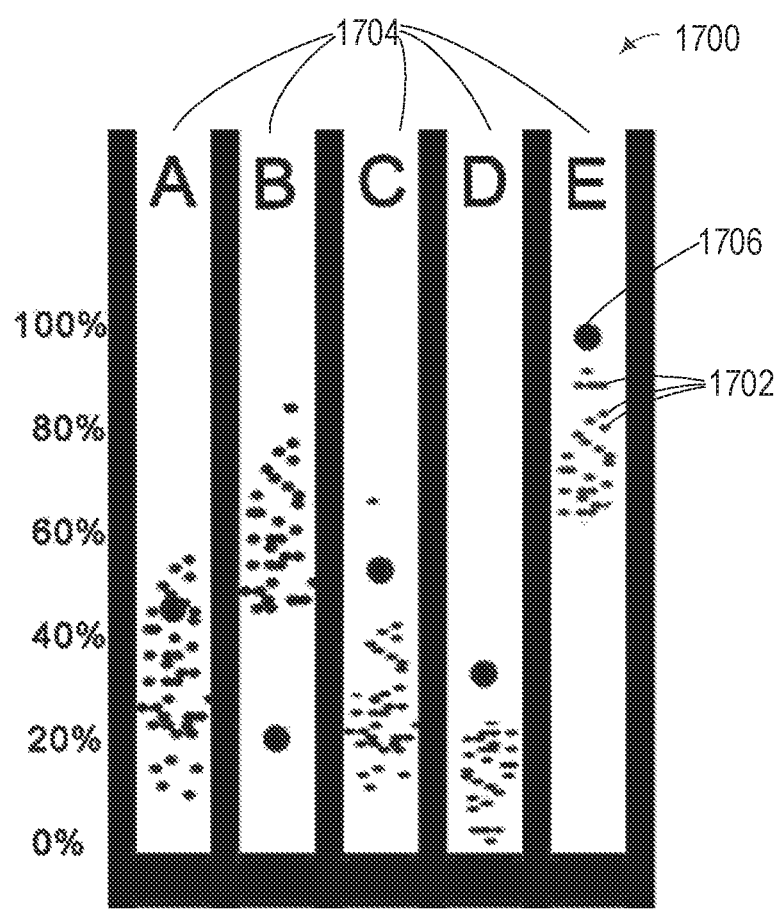
FIG. 17 is an illustration of an exemplary visualization display for the multi-option question.

To implement the multi-option method, we need to enable participants to see a visual representation of how their forecast across the five primary values compares with their neighbors in their sub-swarm. An example inventive visualization display 1700 is shown in FIG. 17, where each participant input is represented by subswarm participant dots 1702. Each column 1704 is associated with one of the primary forecast variables, in this example the same question and variables shown in FIG. 16. The subswarm participant dots 1702 are arranged in each column 1704 to present how the sub-swarm participants distributed their five prediction probabilities. The prediction probabilities of the participant are indicated by the larger dots 1706 showing that participant how their forecast compares with the other forecasts from their sub-swarm across options A,B,C,D, and E.

In the example above, the preferred embodiment enables the participant to "grab" each large dot 1706 that represent their forecast for each of the five items in this example, and slide the dot up or down to adjust their forecasts. This is clear and intuitive, and is easily implemented for either (a) the iterative embodiment described with reference to FIG. 6, and (b) the real-time embodiment described with reference to FIG. 13. In addition, behavioral data can be captured and used in machine learning as described above, for this multi option method. In fact, the behavioral data is even richer.

In the real-time embodiment, participants view the small subswarm participant dots 1702 moving in real time, as they adjust their personal participant dots 1706. This allows convergence on optimal solutions with feedback loops, locally, while overlapping swarms allow propagation throughout the full data structure.

In the above example, a single confidence slider user interface can additionally be implemented in some embodiments. In a preferred embodiment, the single confidence slider user interface (i.e. the secondary variable) is provided to indicate and theoretical wager on their top choice. For example—"How much would you bet on your top choice winning the Oscar?" This data provides a scaling factor the relative confidence across all choices and can be used in the processes described above.

Finally, the methods described herein can be used to provide insightful volumetric visualization of each of the Primary variables (P1, P2, P3 . . . ) being forecast in this way. For example, each of the forecast options can be viewed in real time, as the sentiment propagates across the grid structure.

Another innovative method developed herein is called "neighbor suffering" or "subswarm shuffling" and it involves changing the relative locations of participants in the grid structure over time. There are two unique methods that have been developed.

Firstly, in a "Shuffling Between Predictions" method, the grid is randomized (either completely or partially) between predictions in a prediction set, to ensure that any random biases within sub-swarms are canceled out across a set of predictions. For example, if the prediction set includes 15 football games, the subswarms can be completely or partially randomized between the predictions of each game. This means that when participants view their neighbors' predictions in a sub-swarm, those neighbors will be a completely or partially different set of participants for each of the 15 predictions.

Secondly, in a "Shuffling Between Rounds in a Multi-Round iterative prediction" method, as described above, a two round prediction is described. That said, in some embodiments, additional rounds can be implemented, as described above. To make those additional rounds more valuable, the subswarm compositions can be updated in each additional round. In other words, the grid is randomized (either completely or partially) between additional rounds, to ensure that any random biases within sub-swarms are canceled out across rounds. For example, if the prediction set includes four rounds, the subswarms can be completely or partially randomized between Round 2 and Round 3, and between Round 3 and Round 4. This means that when participants view their neighbors predictions in a sub-swarm for those rounds, those neighbors will be a different set of participants for each of the two subsequent rounds.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for computer-moderated collaborative forecasting among a population of human participants using a plurality of networked computing devices, the method comprising:
   providing a collaboration server running a collaboration application, the collaboration server in communication with the plurality of networked computing devices, each networked computing device associated with one participant;
   providing a local forecasting application on each networked computing device, the local forecasting application configured for displaying forecasting information to and collecting forecasting input from the one participant associated with that networked computing device; and
   enabling through communication between the collaboration application running on the collaboration server and the local forecasting application running on each of the plurality of networked computing devices, the following sequential steps:
   send a forecasting query to the plurality of networked computing devices, the forecasting query describing a future event to be collaboratively predicted by the population of human participants;
   present a representation of the forecasting query to each participant on a display of the networked computing device associated with that participant;
   collect a set of initial forecast responses such that each initial forecast response in the set is provided by a different participant of the population of human participants via a user interface on the computing device associated with that participant;
   store each initial forecast response in a unique location in a data structure in a memory such that each initial forecast response is associated with the participant the response was collected from;
   associate, for each participant, a unique subset of the set of initial forecast responses, wherein each subset represents initial forecast responses collected from a unique subset of participants and wherein at least one initial forecast response in each unique subset is included in at least one other unique subset;
   display the unique subset of initial forecast responses associated with each participant on the networked computing device associated with that participant, thereby enabling each participant to consider initial forecast responses provided by a different unique subset of human participants selected from the population of human participants;
   after displaying the unique subset of initial forecast responses to each participant, collect an updated forecast response from each participant via the user interface on the networked computing device associated with that participant;
   store each updated forecast response in a memory such that each updated forecast response is associated with the participant the updated forecast response was collected from; and
   compute a final collaborative forecast based at least in part upon the set of initial forecast responses and the set of updated forecast responses.

2. The method of claim 1 wherein computing the final collaborative forecasting includes assessing a change, for each participant, between the initial forecast response they provided and the updated forecast response they provided.

3. The method of claim 1 further including the step of assigning a unique sub-population to each participant, wherein each sub-population is a unique subset of the population of human participants that shares at least one participant with at least one other sub-population.

4. The method of claim 3 wherein the subset of initial forecast responses for each of the plurality of participants consists of the initial forecast responses of the sub-population assigned to that participant.

5. The method of claim 1 wherein the steps of presenting the forecast query, collecting updated forecast responses, and storing the set of collected responses are repeated multiple times prior to the step of computing the final collaborative forecast, wherein a plurality of sets of updated forecast responses are stored over a time period, and wherein the final collaborative forecast is based at least in part upon the plurality of sets of updated forecast responses stored over the time period.

6. The method of claim 1 further comprising, during the step of collecting the updated forecast responses, of displaying of a countdown timer on the display associated with each participant indicating an amount of time left for collaborative forecasting, the countdown timer for each participant substantially synchronized.

7. The method of claim 1 wherein the display of the subset of initial forecast responses includes a graphical histogram including the subset of initial forecast responses.

8. The method of claim 1 wherein the display of the unique subset of initial forecast responses includes a set of graphical dots wherein each graphical dot represents one of the unique subset of the set of initial forecast responses.

9. The method of claim 1 further comprising, during displaying of the unique subset of the set of initial forecast responses, also displaying to each participant a graphical indicator showing the respective participant's current forecast response in relation to the displayed unique subset of the set of initial forecast responses.

10. A system for conducting computer-moderated collaborative forecasting among a population of human participants using a plurality of networked computing devices, comprising:
a collaboration server including a processor running a collaboration application, the collaboration server in communication with the plurality of networked computing devices, each networked computing device associated with one participant; and
a local forecasting application on each networked computing device, the local forecasting application configured to display forecasting information to and collect forecasting input from the one participant associated with that networked computing device, wherein the system is enabled through communication between the collaboration application running on the collaboration server and the local forecasting application running on each of the plurality of networked computing devices, to perform the following sequential steps:
send a forecasting query to the plurality of networked computing devices, the forecasting query describing a future event to be collaboratively predicted by the population of human participants;
present a representation of the forecasting query to each participant on a display of the networked computing device associated with that participant;
collect a set of initial forecast responses such that each initial forecast response in the set is provided by a different participant of the population of human participants via a user interface on the networked computing device associated with that participant;
store each initial forecast response in a unique location in a data structure in a memory such that each initial forecast response is associated with the participant the response was collected from;
associate, for each participant, a unique subset of the set of initial forecast responses, wherein each subset represents initial forecast responses collected from a unique subset of participants and wherein at least one initial forecast response in each unique subset is included in at least one other unique subset;
display the unique subset of initial forecast responses associated with each participant on the networked computing device associated with that participant, thereby enabling each participant to consider initial forecast responses provided by a different unique subset of human participants selected from the population of human participants;
after displaying the unique subset of initial forecast responses to each participant, collect an updated forecast response from each participant via the user interface on the networked computing device associated with that participant;
store each updated forecast response in a memory such that each updated forecast response is associated with the participant the updated forecast response was collected from; and
compute a final collaborative forecast based at least in part upon the set of initial forecast responses and the set of updated forecast responses.

11. The system of claim 10 wherein computing the final collaborative forecasting includes assessing a change, for each participant, between the initial forecast response they provided and the updated forecast response they provided.

12. The system of claim 10 further including the step of assigning a unique sub-population to each participant, wherein each sub-population is a unique subset of the population of human participants that shares at least one participant with at least one other sub-population.

13. The system of claim 12 wherein the subset of initial forecast responses for each of the plurality of participants consists of the initial forecast responses of the sub-population assigned to that participant.

14. The system of claim 10 wherein the steps of presenting the forecast query, collecting updated forecast responses, and storing the set of collected responses are repeated multiple times prior to the step of computing the final collaborative forecast, wherein a plurality of sets of updated forecast responses are stored over a time period, and wherein the final collaborative forecast is based at least in part upon the plurality of sets of updated forecast responses stored over the time period.

15. The system of claim 10 further comprising, during the step of collecting the updated forecast responses, of displaying of a countdown timer on the display associated with each participant indicating an amount of time left for collaborative forecasting, the countdown timer for each participant substantially synchronized.

16. The system of claim 10 wherein the display of the subset of initial forecast responses includes a graphical histogram including the subset of initial forecast responses.

17. The system of claim 10 wherein the display of the unique subset of initial forecast responses includes a set of graphical dots wherein each graphical dot represents one of the unique subset of the set of initial forecast responses.

18. The system of claim 10 further comprising, during displaying of the unique subset of the set of initial forecast responses, also displaying to each participant a graphical indicator showing the respective participant's current forecast response in relation to the displayed unique subset of the set of initial forecast responses.

* * * * *